(12) United States Patent
Surjaatmadja et al.

(10) Patent No.: US 10,747,240 B1
(45) Date of Patent: Aug. 18, 2020

(54) FLOW EXCHANGER SYSTEM, TRANS-PRESSURE CONDUCTION SYSTEM FOR HIGH PRESSURE SAND SLURRY DELIVERY SYSTEM

(71) Applicant: Halliburton Energy Services, Inc., Houston, TX (US)

(72) Inventors: Jim Basuki Surjaatmadja, Duncan, OK (US); Thomas M. Logan, Norman, OK (US); Timothy Holiman Hunter, Duncan, OK (US); Austin Carl Schaffner, Lawton, OK (US); Iosif Joseph Hriscu, Duncan, OK (US); Brad Robert Bull, Duncan, OK (US); Robert Lee Pipkin, Marlow, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/702,127

(22) Filed: Dec. 3, 2019

(51) Int. Cl.
  *B01F 15/04* (2006.01)
  *B01F 5/04* (2006.01)
  *G05D 7/06* (2006.01)

(52) U.S. Cl.
  CPC .......... *G05D 7/0652* (2013.01); *B01F 5/04* (2013.01); *B01F 15/047* (2013.01); *B01F 15/0416* (2013.01)

(58) Field of Classification Search
  CPC ............... B01F 5/0471; B01F 15/0217; B01F 15/0247; B01F 15/0416; B01F 15/1454; B01F 15/0458; B01F 15/0462; B01F 15/047; B01F 15/0454; G05D 7/0652
  See application file for complete search history.

(56) References Cited

U.S. PATENT DOCUMENTS

| 3,123,342 A * | 3/1964 | Little ................. B29B 7/40 366/76.93 |
| 3,743,141 A * | 7/1973 | Mnilk ................. B01F 15/0462 222/67 |
| 3,908,862 A * | 9/1975 | Chandra ............. B29B 7/7626 222/63 |

(Continued)

FOREIGN PATENT DOCUMENTS

WO  WO-02069066 A2 *  9/2002  ........ B01F 15/00136

*Primary Examiner* — Charles Cooley
(74) *Attorney, Agent, or Firm* — Conley Rose, P.C.; Rodney B. Carroll

(57) ABSTRACT

A flow exchanger (FE) system comprising: a supplement pump receiving a supplement first fluid stream and outputting a pressurized supplement first fluid stream; a flow splitter comprising a flow restrictor, wherein the flow splitter receives the pressurized supplement first fluid stream and outputs a power stream and a treatment stream; a main flow manifold, wherein the treatment stream enters the main flow manifold subsequent to passing through the flow restrictor; and an FE cylinder filled downstream with a second fluid and having a fluid interface separator (FIS), wherein the power stream enters the FE cylinder upstream; wherein the power stream engages and pushes FIS downstream, thereby providing for a second fluid stream entering the main flow manifold; wherein a second fluid stream VFR=a power stream VFR; and wherein the main flow manifold provides for a manifold output fluid stream VFR=a pressurized supplement first fluid stream VFR.

17 Claims, 2 Drawing Sheets

(56) References Cited

U.S. PATENT DOCUMENTS

| | | | |
|---|---|---|---|
| 4,032,040 A * | 6/1977 | Kecskemethy | B01F 15/0458 |
| | | | 222/1 |
| 4,394,870 A * | 7/1983 | MacPhee | B01F 15/0458 |
| | | | 137/99 |
| 4,473,459 A | 9/1984 | Bose et al. | |
| 4,611,982 A * | 9/1986 | Haeuser | B01F 15/0237 |
| | | | 264/328.2 |
| 6,315,837 B1 | 11/2001 | Barclay | |
| 8,585,909 B2 | 11/2013 | McAfee et al. | |
| 8,851,862 B2 | 10/2014 | Odegard | |
| 2004/0112822 A1 | 6/2004 | Saik | |
| 2006/0107978 A1 | 5/2006 | Saik | |
| 2008/0095652 A1 | 4/2008 | Jiang | |
| 2010/0254214 A1 | 10/2010 | Fisher et al. | |
| 2012/0175127 A1 | 7/2012 | Yale et al. | |
| 2016/0084044 A1 | 3/2016 | Shen et al. | |
| 2019/0070575 A1 * | 3/2019 | Surjaatmadja | B01F 7/082 |

\* cited by examiner

FLOW EXCHANGER SYSTEM, TRANS-PRESSURE CONDUCTION SYSTEM FOR HIGH PRESSURE SAND SLURRY DELIVERY SYSTEM

BACKGROUND

This disclosure relates to flow exchanger systems and methods of using same. More specifically, it relates to flow exchanger systems that can provide for the introduction of an agent (e.g., proppant, sand) in a pressurized fluid without the use of the agent in high pressure pumps; and methods of using same.

Many industrial processes employ relatively high pressure fluids (e.g., fracturing fluids, acidizing fluids, etc.), where such high pressure fluids are provided at the desired pressure via high pressure pumps. However, some high pressure fluids may contain a variety of materials that can be undesirable in the high pressure pumps, such as abrasive materials and/or corrosive materials. Generally, high pressure pumps are expensive, and abrasive and/or corrosive materials can substantially decrease the life of a high pressure pump or its components.

Conventionally, energy recovery or exchange devices can be used to transfer pressure energy from "clean" fluids (e.g., fluids lacking abrasive materials and/or corrosive materials) pumped at high pressure via high pressure pumps to "dirty" fluids or "unclean" fluids (e.g., fluids containing abrasive materials and/or corrosive materials), in order to avoid pumping the unclean fluids via the high pressure pumps. However, conventional energy recovery devices require excess energy to power additional pumps, elaborated means of metering a desired amount of agent to be introduced in the high pressure fluid, etc. Thus, an ongoing need exists for systems that can accurately deliver a desired amount of agent into a high pressure fluid, while avoiding the use of high pressure pumps for directly pumping the agent, and without increasing the energy requirements of the system.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DETAILED DESCRIPTION

Figure 1:
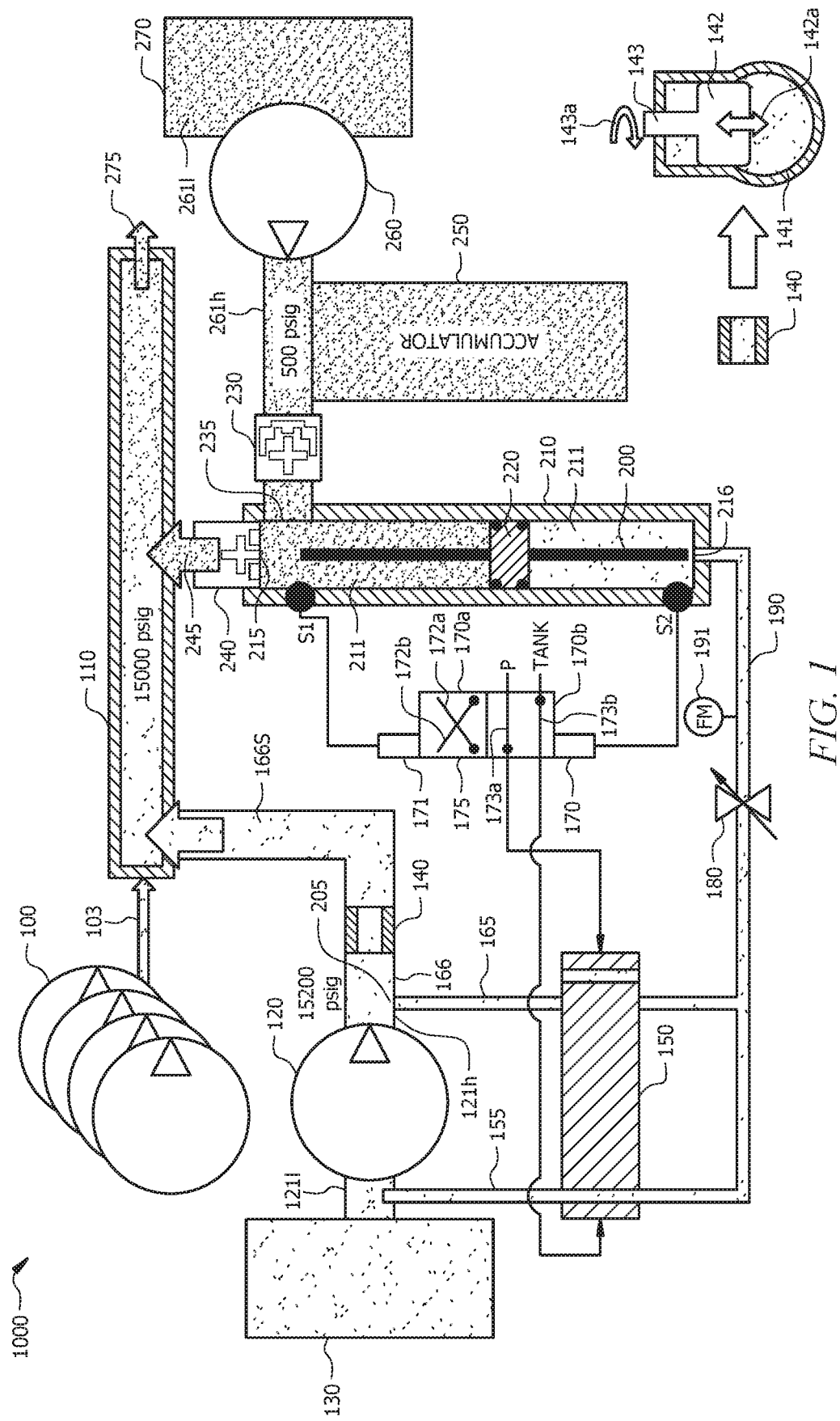
FIG. 1 displays a schematic of a flow exchanger system.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques below, including the exemplary designs and implementations illustrated and described herein, but may be modified within the scope of the appended claims along with their full scope of equivalents.

In the drawings and description that follow, like parts are typically marked throughout the specification and drawings with the same reference numerals, respectively. In addition, similar reference numerals may refer to similar components in different embodiments disclosed herein. The drawing figures are not necessarily to scale. Certain features of the disclosed embodiments may be shown exaggerated in scale or in somewhat schematic form and some details of conventional elements may not be shown in the interest of clarity and conciseness. The present disclosure is susceptible to embodiments of different forms. Specific embodiments are described in detail and are shown in the drawings, with the understanding that the present disclosure is not intended to be limited to the embodiments illustrated and described herein. It is to be fully recognized that the different teachings of the embodiments discussed herein may be employed separately or in any suitable combination to produce desired results.

Disclosed herein is a flow exchanger system, which employs a trans-pressure conduction system for the delivery of high pressure fluids comprising an agent such as an abrasive material and/or a corrosive material. For example, the flow exchanger system disclosed herein can use near zero horsepower to compress a sand slurry to a high pressure slurry with near zero flow loss, such as less than a gallon fluid loss per stroke of fluid interface separator (FIS), for example to counter the compressibility of the liquid and expansion of the pressure in a chamber or cylinder housing the FIS; followed by pushing the high pressure slurry via the FIS towards a wellhead high pressure flow stream at almost the same pressure as the wellhead high pressure flow stream.

The flow exchanger system as disclosed herein can provide for a low pressure system (e.g., pump system) moving a defined (e.g., limited) amount of sand slurry into a highly pressurized containment (e.g., main flow manifold) without the use of additional high pressure pumps, which results in spending a relatively small amount of energy followed by reclaiming about the same amount of energy and using it to move the sand slurry from a low pressure enclosure towards a relatively high pressure state. In practice, the flow exchanger system as disclosed herein can allow for only pumping "clean" fracturing fluids at relatively high pressures (e.g., high pressure clean fluid), while using a dedicated set of relatively low pressure pumps to produce a very high concentration sand slurry (e.g., up to 27 lbs sand in 1 gallon of liquid, which is also known as "wet sand"), packaging the sand slurry concentrate in a container, and transferring a portion of the energy from the high pressure clean fluid to the sand slurry by using a flow restrictor to produce a highly pressured sand slurry concentrate, followed by pushing the highly pressured sand slurry concentrate into the high pressure clean fluid.

The flow exchanger system as disclosed herein can package a relatively low pressure high concentration sand slurry, compress the packaged sand slurry, and deliver the compressed packaged sand slurry into a relatively high pressure flow clean stream. Generally, a concentrated sand slurry can be produced with any suitable blending system, followed by delivering the blended sand slurry with the use of a relatively low pressure centrifugal pump and/or a relatively low pressure mud pump, wherein the relatively low pressure sand slurry is delivered into one or more containers or chambers (e.g., cylinders) through a "delivery valve" until the container is filled with a desired amount of sand slurry. The container comprises an FIS, wherein the sand slurry is introduced on a downstream side of the container/FIS. Relatively high pressure pumps can deliver relatively high pressure clean fluid via a flow restrictor that can divert a desired amount of high pressure clean fluid (at a desired flow rate) towards the container. Subsequent to introducing the sand slurry into the container, an upstream side of the container/FIS can be connected via a valve system to the diverted high pressure clean fluid, wherein the flow rate of the diverted high pressure clean fluid matches the flow rate of the packaged sand slurry delivered (e.g., pushed, introduced) into the remainder of the high pressure clean fluid (that passes through the flow restrictor, as opposed to being diverted).

In some embodiments, the flow exchanger system as disclosed herein can be used as a split flow stimulation system in a wellbore servicing operation, wherein mixing of pressurized sand slurry with pressurized clean fluid can occur on the surface (e.g., near and/or far from the wellbore); and/or in situ (inside the wellbore), up to and including depths near wellbore perforations. The flow exchanger system as disclosed herein can employ (A) a relatively large number of pumps to provide for the majority of the relatively high pressure clean fluid desired in a particular application (e.g., stimulation, fracturing, etc.), wherein all of these pumps pump clean fluid (e.g., water, gel, slick water, etc.); (B) a blending system that can deliver a known or desired amount of high concentration slurry into one or more containers (e.g., on a downstream side of the containers/FIS); and (C) a relatively small number of pumps which provide for a relatively small amount of high pressure clean fluid, wherein a portion of the clean fluid pressurized by these pumps can be used to drive other flow exchangers, as necessary; wherein flow restrictors (such as variable flow gates) are located downstream of these pumps and upstream of the containers, wherein the flow restrictors can divert (e.g., direct) a relatively small portion of the clean pressurized fluid output by these pumps to the containers in order to pressurize the high concentration slurry across the FIS; wherein the flow restrictors can be closed to increase the diverted flow to the containers, thereby providing for a clean fluid pushing the FIS via an injection or discharge stroke, and consequently pushing the high concentration slurry into the relatively high pressure clean fluid delivered by the relatively large number of pumps in (A); wherein, subsequent to the injection stroke, the portion of the high pressure clean fluid that was used to power the injection stroke is depressurized and pushed back into a reservoir or tank containing clean fluid (wherein the relatively large number of pumps in (A) can source the clean fluid they are pumping from the reservoir or tank containing clean fluid); and wherein the flow rate of the clean fluid diverted by the flow restrictors is about the same as the flow rate of the high concentration slurry delivered into the relatively high pressure clean fluid via the injection stroke. Any suitable controllers can be added to the flow exchanger system, such as flow meters, in order to accurately monitor the amount of high concentration slurry delivered into the relatively high pressure clean fluid via the injection stroke. The flow restrictor (e.g., variable flow gate) can be operator controlled and/or computer controlled; however, the flow restrictor (e.g., variable flow gate) could also be completely sealed in and rotated using a magnetic drive. The flow restrictor (e.g., variable flow gate) as disclosed herein can also be adjusted semi-manually, by dialing in a pressure difference (for example via a compression system), which could be accomplished with a spring on one side of a membrane, for example; wherein the pressure difference used (e.g., employed) controls the speed of the flow exchanger (e.g., the speed of a fluid interface separator slidably positioned within the flow exchanger, as will be described in more detail later herein). Compressing the spring by tightening (e.g., slightly tightening) the spring, for example, by an operator, can increase the speed of the fluid interface separator (e.g., injector piston). In other configurations, a computer can be used for compressing and/or decompressing the spring that actuates the compression system. The flow restrictor (e.g., variable flow gate) as disclosed herein is advantageously versatile.

In some embodiments, for example as depicted in FIG. 1, a flow exchanger (FE) system 1000 as disclosed herein can comprise a supplement pump 120; a tank 130; one or more optional additional pumps 100; a flow splitter 205; a flow restrictor 140; a main flow manifold 110; a valve system 150; a valve controller 175; an optional variable choke 180; a first fluid conduit 190; an FE cylinder 210; a fluid interface separator (FIS) 220; an intake valve 230; a discharge valve 240; a filling pump 260; an optional accumulator 250; a vessel 270; and one or more position sensors S1, S2, 200. The FE system 1000 is transitionable between a filling configuration (e.g., suction configuration) and a discharge configuration.

In an embodiment, the supplement pump 120 (e.g., a first pump) is a high pressure pump or a relatively high pressure pump, wherein the supplement pump 120 is configured to receive a supplement first fluid stream 121*l* (e.g., supplement clean fluid stream; first stream at a low pressure; first stream at a relatively low pressure) and output a pressurized supplement first fluid stream 121*h* (e.g., pressurized supplement clean fluid stream; first stream at a high pressure; first stream at a relatively high pressure). The pressurized supplement first fluid stream 121*h* is characterized by a pressure (e.g., first pressure) that is greater than a pressure of the supplement first fluid stream 121*l*. The pressurized supplement first fluid stream 121*h* is characterized by a first volumetric flow rate (VFR). The supplement pump 120 can be any suitable high pressure pump, such as a centrifugal pump; a multi-stage centrifugal pump; a positive displacement pump having a piton, a plunger, a gear, etc.; and the like.

The supplement pump 120 receives the supplement first fluid stream 121*l* at a pressure lower than the first pressure. For example, the supplement first fluid stream 121*l* is conveyed from the tank 130 (e.g., a first fluid tank; a clean fluid tank; a reservoir; a first fluid reservoir; a clean fluid reservoir) at a pressure of from about ambient pressure (e.g., atmospheric pressure) to about 100 psig, alternatively from about ambient pressure to about 75 psig, or alternatively from about ambient pressure to about 50 psig; which can be substantially the same as the pressure of the tank 130 containing a clean fluid (e.g., first fluid). In some embodiments, and depending on the geometry of the tank 130, and at what tank fluid level the stream 121*l* is conveyed from the tank 130; the pressure of the supplement first fluid stream 121*l* can be greater than the pressure of the tank 130 by an amount about equal to the hydrostatic pressure corresponding to the fluid height above the tank fluid level where the stream 121*l* is conveyed from. The tank 130 can be characterized by a pressure of from about ambient pressure (e.g., atmospheric pressure) to about 100 psig.

In some embodiments, the pressure of the pressurized supplement first fluid stream 121*h* (e.g., first pressure) can be equal to or greater than about 1,000 psig, alternatively equal to or greater than about 2,500 psig, alternatively equal to or greater than about 5,000 psig, alternatively equal to or greater than about 10,000 psig, alternatively equal to or greater than about 15,000 psig, alternatively equal to or greater than about 25,000 psig, alternatively equal to or greater than about 30,000 psig, alternatively equal to or greater than about 50,000 psig, alternatively equal to or greater than about 75,000 psig, alternatively equal to or greater than about 100,000 psig, alternatively from about 1,000 psig to about 50,000 psig, alternatively from about 2,500 psig to about 25,000 psig, alternatively from about 5,000 psig to about 20,000 psig, or alternatively from about 5,000 psig to about 15,000 psig.

In an embodiment, the streams 121*l*, 121*h* comprise a first fluid, wherein the first fluid is substantially free of an agent (e.g., proppant, sand). The first fluid is a clean fluid, wherein the clean fluid is substantially free of an agent that is undesirable in the supplement pump 120, as the agent may damage or reduce the life time of the supplement pump 120 or components thereof. For purposes of the disclosure herein, the term "clean fluid" refers to a fluid (e.g., first fluid) that does not contain a significant amount of the agent; for example, the clean fluid comprises the agent in an amount of less than about 5 wt. %, alternatively less than about 4 wt. %, alternatively less than about 3 wt. %, alternatively less than about 2 wt. %, alternatively less than about 1 wt. %, alternatively less than about 0.5 wt. %, alternatively less than about 0.1 wt. %, alternatively less than about 0.01 wt. %, or alternatively less than about 0.001 wt. %, based on the total weight of the clean fluid. In an embodiment, the clean fluid is substantially free of the agent. In an embodiment, the clean fluid does not contain a significant amount of solid materials (e.g., abrasive materials, proppant, sand, gravel) suspended therein. The clean fluid is substantially free of a solid material (e.g., abrasive material, proppant, sand, gravel) suspended therein.

In some embodiments, the clean fluid is an aqueous fluid. In other embodiments, the clean fluid is an oil-based fluid. In yet other embodiments, the clean fluid includes an emulsion or an invert emulsion.

Aqueous fluids that may be used as clean fluids in the present disclosure may include water or a brine. In an embodiment, the clean fluid includes an aqueous brine. In such embodiment, the aqueous brine generally includes water and an inorganic monovalent salt, an inorganic multivalent salt, or both. The aqueous brine may be naturally occurring or artificially-created. Water present in the brine may be from any suitable source, examples of which include, but are not limited to, sea water, tap water, freshwater, water that is potable or non-potable, untreated water, partially treated water, treated water, produced water, city water, well-water, surface water, liquids including water-miscible organic compounds, and combinations thereof. The salt or salts in the water may be present in an amount ranging from greater than about 0% by weight to a saturated salt solution, alternatively from about 1 wt. % to about 30 wt. %, or alternatively from about 5 wt. % to about 10 wt. %, based on the weight of the salt solution. In an embodiment, the salt or salts in the water may be present within the clean fluid in an amount sufficient to yield a saturated brine. In some embodiments, the brines may include any suitable additives, such as viscosifying agents.

Nonlimiting examples of aqueous brines suitable for use in the present disclosure include chloride-based, bromide-based, phosphate-based or formate-based brines containing monovalent and/or polyvalent cations, salts of alkali and alkaline earth metals, or combinations thereof. Additional examples of suitable brines include, but are not limited to brines including NaCl, KCl, NaBr, $CaCl_2$, $CaBr_2$, $ZnBr_2$, ammonium chloride ($NH_4Cl$), potassium phosphate, sodium formate, potassium formate, cesium formate, ethyl formate, methyl formate, methyl chloroformate, triethyl orthoformate, trimethyl orthoformate, or combinations thereof. In an aspect, the clean fluid includes a brine.

In an embodiment, the clean fluid includes an oil-based fluid, such as for example an oleaginous fluid. Examples of oleaginous fluids suitable for use as a clean fluid in the present disclosure include, but are not limited to, petroleum oils, natural oils, synthetically-derived oils, oxygenated fluids, or combinations thereof. In an embodiment, the oleaginous fluid includes diesel oil, kerosene oil, mineral oil, synthetic oils, aliphatic hydrocarbons, polyolefins (e.g., alpha olefins, linear alpha olefins and/or internal olefins), paraffins, silicone fluids, polydiorganosiloxanes, oxygenated solvents, esters, diesters of carbonic acid, alcohols, alcohol esters, ethers, ethylene glycol, ethylene glycol monoalkyl ether, ethylene glycol dialkyl ether, or combinations thereof, wherein the alkyl groups are methyl, ethyl, propyl, butyl, and the like.

In an embodiment, the clean fluid includes an emulsion. In such embodiment, the emulsion is an oil-in-water emulsion including a non-oleaginous (e.g., an aqueous fluid of the type previously described herein) continuous phase and an oleaginous (e.g., an oil-based fluid of the type previously described herein) discontinuous phase.

In another embodiment, the clean fluid includes an invert emulsion. In such embodiment, the invert emulsion is a water-in-oil emulsion including an oleaginous (e.g., an oil-based fluid of the type previously described herein) continuous phase and a non-oleaginous (e.g., an aqueous fluid of the type previously described herein) discontinuous phase.

In an embodiment, the agent can be any substance or material that is undesirable in relatively high pressure pumps, such as the supplement pump 120, wherein the agent is however desirable in a relatively high pressure fluid (e.g., a fluid characterized by about the first pressure, such as the pressurized supplement first fluid stream 121*h*) for use in a particular application. Nonlimiting examples of agents include a proppant, sand, rocks, sticks, fibers, gravel, sintered bauxite, a ceramic material, a diverting material, an abrasive material, a fluid loss material, an acid, HCl, HF, a scale inhibitor, a friction reducer, and the like, or combinations thereof.

Nonlimiting examples of proppants suitable for use in this disclosure include silica (sand), graded sand, Ottawa sands, Brady sands, Colorado sands; resin-coated sands; gravels; synthetic organic particles, nylon pellets, high density plastics, teflons, polytetrafluoroethylenes, rubbers, resins; ceramics, aluminosilicates; glass; sintered bauxite; quartz; aluminum pellets; ground or crushed shells of nuts, walnuts, pecans, almonds, ivory nuts, brazil nuts, and the like; ground or crushed seed shells (including fruit pits) of seeds of fruits, plums, peaches, cherries, apricots, and the like; ground or crushed seed shells of other plants (e.g., maize, corn cobs or corn kernels); crushed fruit pits or processed wood materials, materials derived from woods, oak, hickory, walnut, poplar, mahogany, and the like, including such woods that have been processed by grinding, chipping, or other form of particleization; resin coated particulate materials; or combinations thereof. In an embodiment, the proppant comprises sand.

The proppant may be of any suitable size and/or shape. In an embodiment, a proppant suitable for use in the present disclosure may have an average particle size in the range of from about 2 to about 400 mesh, alternatively from about 8 to about 100 mesh, or alternatively from about 10 to about 70 mesh, U.S. Sieve Series. Nonlimiting examples of proppant shapes suitable for use in the present disclosure include cylindrical, discoidal, spherical, tabular, ellipsoidal, equant, irregular, cubic, acicular, and the like, or combinations thereof.

In an embodiment, the flow splitter 205 is configured to receive the pressurized supplement first fluid stream 121*h* and output two first fluid streams comprising (i) a power stream 165 and (ii) a treatment stream 166, 166S. The flow splitter 205 can be a tee (for example as illustrated in FIG. 1), wherein the tee has two output branches conveying each of the power stream 165 and the treatment stream 166. The output branch of the tee 205 which conveys the treatment stream 166 can comprise a flow restrictor 140. In configurations where the flow restrictor 140 is positioned on the output branch proximal to the tee branching point (but not right at the tee branching point), for example as illustrated in FIG. 1, the treatment stream will have a different pressure (e.g., higher pressure) before passing through the flow restrictor 140 (stream 166) and after passing through the flow restrictor 140 (stream 166S of lower pressure).

The treatment stream 166S can enter the main flow manifold 110, subsequent to passing through the flow restrictor 140. In embodiments where only the supplement pump 120 is used for providing the relatively high pressure clean fluid for a desired application, the main flow manifold 110 can provide for a manifold output fluid stream 275 (e.g., injectable fluid, fracturing fluid, etc.) VFR that is substantially the same as the VFR of the pressurized supplement clean stream 121h (e.g., first VFR).

In some embodiments, the flow restrictor 140 can have a variable opening (e.g., a variable gate; a variable flow gate). In other embodiments, the flow restrictor 140 can have a fixed opening (e.g., a fixed opening restrictor).

In embodiments where the flow restrictor 140 has a variable opening, the flow restrictor 140 can be a first valve 140 configured to (1) increase a pressure of the power stream 165 to a pressure that is from about 100 psig to about 500 psig, alternatively from about 125 psig to about 475 psig, or alternatively from about 150 psig to about 450 psig greater than a pressure of the treatment stream 166S prior to the power stream 165 entering the FE cylinder 210 on an upstream side; and (2) decrease a pressure of the treatment stream 166S to a pressure that is from about 100 psig to about 500 psig, alternatively from about 125 psig to about 475 psig, or alternatively from about 150 psig to about 450 psig lower than a pressure of the power stream 165, prior to the treatment stream 166S entering the main flow manifold 110. In an embodiment, the first valve 140 can be a variable flow control valve. In an embodiment, the first valve 140 can be a low pressure choking gate.

In an embodiment, the VFR of the power stream 165 can be from about 1% to about 80%, alternatively be from about 2.5% to about 70%, or alternatively be from about 5% to about 60% of a VFR of the treatment stream 166S.

In embodiments where the first valve 140 is a valve having a variable opening, for example as illustrated in the inset in FIG. 1, the flow restrictor 140 can comprise a valve body 141 housing a plug 142 that can be actuated 143a via a stem 143, wherein the plug 142 can move 142a within the valve body, thereby varying the flow of fluid through the valve as desired. The first valve 140 can be computer controlled or manually controlled to vary the flow of fluid through the first valve 140 as desired, thereby providing for controlling the pressure and VFR of the fluid flowing through the first valve 140 (e.g., treatment stream 166S), and consequently the pressure and VFR of the power stream 165 diverted from the pressurized supplement first fluid stream 121h. Further, controlling the fluid flow through the first valve 140 also provides for controlling the pressure and VFR imparted to the second fluid via the FIS 220, as will be described in more detail later herein.

In embodiments where the flow restrictor 140 has a fixed opening, the variable choke 180 can be positioned between the valve system 150 and the FE cylinder 210; wherein the variable choke 180 can control the power stream 165 entering the FE cylinder 210 in terms of pressure and VFR, thereby controlling the pressure and the VFR imparted to the second fluid via the FIS 220. The variable choke 180 can be located on first fluid conduit 190 (e.g., clean fluid conduit) providing a flowpath into and/or out of the FE cylinder 210 via the first fluid port 216. The variable choke 180 can be configured to control a VFR of a first fluid (e.g., clean fluid, such as power stream 165) flowing through the first fluid conduit 190. For example, the VFR of the first fluid flowing through the first fluid conduit 190 can be monitored with a flow meter 191. As another example, the VFR of the first fluid flowing through the first fluid conduit 190 can be determined by monitoring a position of the FIS 220 with the one or more position sensors S1, S2, 200, as will be described in more detail later herein. In an embodiment, the FE system 1000 can comprise one or more flow meters (e.g., flow meter 191) and/or one or more mass meters located on streams substantially free of the agent (e.g., clean streams), such as streams flowing via conduit 190.

In an embodiment, the filling pump 260 is a low pressure pump or a relatively low pressure pump, wherein the filling pump 260 is configured to receive a filling second fluid stream 261l (e.g., filling unclean fluid stream; second stream at a low pressure; second stream at a relatively low pressure) and output a pressurized filling second fluid stream 261h (e.g., pressurized filling unclean fluid stream; second stream at a high pressure; second stream at a relatively high pressure). The pressurized filling second fluid stream 261h is characterized by a pressure (e.g., second pressure) that is greater than a pressure of the filling second fluid stream 261l. The filling pump 260 can be any suitable low pressure pump, such as a slurry pump, a mud pump, a positive displacement pump, a centrifugal pump, a centrifugal boost pump, etc.

For purposes of the disclosure herein, the supplemental pump 120 is a relatively high pressure pump when compared to the filling pump 260. Similarly, for purposes of the disclosure herein, the pressure of the pressurized supplement clean stream 121h is a relatively high pressure when compared to the pressure of the pressurized filling second fluid stream 261h (i.e., the pressure of the pressurized supplement clean stream 121h is greater than the pressure of the pressurized filling unclean stream 261h).

Further, for purposes of the disclosure herein, the filling pump 260 is a relatively low pressure pump when compared to the supplemental pump 120. Similarly, for purposes of the disclosure herein, the pressure of the pressurized filling second fluid stream 261h is a relatively low pressure when compared to the pressure of the pressurized supplement clean stream 121h (i.e., the pressure of the pressurized filling unclean stream 261h is lower than the pressure of the pressurized supplement clean stream 121h).

The filling pump 260 receives the filling second fluid stream 261l at a pressure lower than the second pressure. For example, the filling second fluid stream 261l can be conveyed from the vessel 270 (e.g., a second fluid vessel; an unclean fluid vessel) at a pressure of from about ambient pressure to about 100 psig, alternatively from about ambient pressure to about 75 psig, or alternatively from about ambient pressure to about 50 psig. The vessel 270 can comprise any suitable mixing device or system (e.g., a mixer and/or a blender) that can provide for the second fluid. The vessel 270 can be any suitable storage vessel containing the second fluid. In embodiments where the second fluid is a slurry, a solid agent (e.g., proppant, sand) can be stored in a hopper and conveyed to the vessel 270 in an amount effective to provide for the desired concentration of the agent in the vessel 270 (e.g., desired concentration of the agent in the unclean fluid), wherein a base fluid (e.g., an unclean base fluid) can also be introduced to the vessel 270 and mixed with the solid agent for forming the unclean fluid slurry (e.g., filling second fluid; unclean fluid). In embodiments where the unclean fluid is a slurry, the agent (e.g., solid particles) can settle, and as such the slurry may need to be continually mixed and/or circulated in vessel 270. In embodiments where the agent is a corrosive material such as an acid, a concentrated acid solution (e.g., concentrated HCl, such as about 38% HCl) can be conveyed to the vessel 270 in an amount effective to provide for the desired concentration of the agent in the vessel 270 (e.g., desired concentration of the agent in the unclean fluid), wherein a base fluid (e.g., an unclean base fluid) can also be introduced to the vessel 270 and mixed with the concentrated acid for forming the unclean fluid slurry (e.g., filling second fluid; unclean fluid).

In some embodiments, the pressure of the pressurized filling second fluid stream 261*h* (e.g., second pressure) can be equal to or greater than about 50 psig, equal to or greater than about 100 psig, alternatively equal to or greater than about 250 psig, alternatively equal to or greater than about 500 psig, alternatively equal to or greater than about 1,000 psig, alternatively from about 50 psig to about 1,000 psig, alternatively from about 75 psig to about 750 psig, alternatively from about 50 psig to about 500 psig, or alternatively from about 100 psig to about 500 psig.

In some aspects, the accumulator 250 can be positioned between the filling pump 260 and the FE cylinder 210, wherein the accumulator 250 can be configured to provide for a substantially uniform pressure of the pressurized filling second fluid stream 261*h*. The accumulator 250 can be any suitable pressure accumulator, such as a membrane accumulator, a bladder accumulator, a balloon accumulator, a piston accumulator, and the like, or combinations thereof.

In an embodiment, the streams 261*l*, 261*h* comprise a second fluid, wherein the second fluid comprises the agent (e.g., proppant, sand). The second fluid is an unclean fluid, wherein the agent in the unclean fluid is desirable in a relatively high pressure fluid for a particular application (e.g., wellbore servicing application). For purposes of the disclosure herein, the terms "unclean fluid" or "dirty fluid" can be used interchangeably and refer to a fluid (e.g., second fluid) that contains a significant amount of the agent. The unclean fluid comprises an unclean base fluid and the agent. For example, the unclean fluid comprises the agent in an amount of equal to or greater than about 5 wt. %, alternatively equal to or greater than about 10 wt. %, alternatively equal to or greater than about 15 wt. %, alternatively equal to or greater than about 20 wt. %, or alternatively equal to or greater than about 25 wt. %, based on the total weight of the unclean fluid. In an embodiment, the unclean fluid contains a significant amount of solid materials (e.g., proppant, sand, gravel) suspended therein (e.g., suspended in the unclean base fluid).

In some embodiments, the second fluid can be a sand slurry (e.g., aqueous sand slurry); for example, a sand slurry having from about 5 lbs to about 27 lbs of sand per gallon of fluid, alternatively from about 10 lbs to about 27 lbs of sand per gallon of fluid, alternatively from about 20 lbs to about 27 lbs of sand per gallon of fluid, or alternatively from about 15 lbs to about 25 lbs of sand per gallon of fluid.

In some embodiments, the unclean base fluid is an aqueous fluid. For example, unclean fluid comprises an aqueous fluid and the agent. In other embodiments, the unclean base fluid is an oil-based fluid. For example, the unclean fluid comprises an oil-based fluid and the agent. In yet other embodiments, the unclean base fluid includes an emulsion or an invert emulsion. For example, the unclean fluid comprises an emulsion or an invert emulsion, and the agent.

The unclean base fluid has been described in detail herein as clean fluid. The unclean base fluids disclosed herein can be the same or different than the clean fluids disclosed herein. For example, the clean fluid and the unclean base fluid can both be seawater. As another example, the clean fluid can be seawater, and unclean base fluid can be a KCl brine. As yet another example, the clean fluid can be an oleaginous fluid, and the unclean base fluid can be an invert emulsion.

In an embodiment, the FE cylinder 210 (e.g., an FE chamber; an FE container) comprises an FE inner chamber 211, wherein the FIS 220 is positioned slidably inside the FE inner chamber 211, wherein the FIS 220 is movable between a downstream end position and an upstream end position within the FE inner chamber 211, wherein the downstream end position is located at a second fluid outlet 215 and/or a second fluid inlet 235, and wherein the upstream end position is located at a first fluid port 216. While the current disclosure is discussed in detail in the context of the FE being a cylinder (i.e., having a cylindrical geometry), it should be understood that the FE 210 can have any suitable geometry that allows for the pressurized clean fluid to transfer pressure energy to the unclean fluid across and via the FIS 220. A transverse cross-section of the FE chamber 210 can have any suitable geometry (e.g., circular, oval, elyptical, square, pentagonal, hexagonal, etc.), provided that (i) the transverse cross-section of the FE chamber 210 is substantially uniform in both size and shape across a length of the FE chamber 210, and (ii) the transverse cross-section of the FE chamber 210 is substantially the same as a transverse cross-section of the FIS 220.

The FE cylinder 210 can be any suitable high pressure container that can withstand pressures of equal to or greater than about the first pressure. The high pressure container can comprise a shell that is designed to withstand pressures of equal to or greater than about the first pressure.

The FIS 220 can comprise a piston, a plug, a steel plug, a cement plug, an upstream side cement plug, a downstream side cement plug, a circular plug, a wiper plug, a wiper dart, a membrane, a gel, a semisolid material, and the like, or combinations thereof. In some embodiments, the FIS 220 can have a substantially circular transverse cross-section. The FIS does not need to create an absolute seal within the FE cylinder 210, wherein some leakage may be tolerable, such as from about 0 vol. % to about 10 vol. %, alternatively from about 0.1 vol. % to about 5 vol. %, alternatively from about 0.25 vol. % to about 2.5 vol. %, alternatively from about 0.5 vol. % to about 2 vol. %, or alternatively from about 1 vol. % to about 2 vol. %, based on the total volume of the FE inner chamber 211.

The power stream 165 is configured to enter the FE cylinder 210 on an upstream side (for example during the discharge configuration), for example via the first fluid port 216. The first fluid port 216 can comprise a first fluid inlet 216 (e.g., clean fluid inlet) and a first fluid outlet (e.g., clean fluid outlet), wherein the first fluid inlet 216 and the first fluid outlet can be the same or different. In embodiments where the first fluid inlet 216 and the first fluid outlet are the same, and as illustrated in the configuration of FIG. 1, the FE cylinder 210 comprise only one port or opening that allows for the clean fluid to both (i) enter the FE cylinder 210 (for example during the discharge configuration, as will be described in more detail later herein) and (ii) exit the FE cylinder 210 (for example during the filling configuration, as will be described in more detail later herein). In embodiments where the first fluid inlet 216 and the first fluid outlet are different, the FE cylinder can comprise (1) a port or opening such as first fluid inlet 216 that allows for the clean fluid to enter the FE cylinder 210 (for example during the discharge configuration), and (2) a port or opening such as first fluid outlet that allows for the clean fluid to exit the FE cylinder 210 (for example during the filling configuration). In embodiments where the first fluid inlet 216 and the first fluid outlet are different, the first fluid inlet 216 and the first fluid outlet may fluidly connect to the first fluid conduit 190 (e.g., clean fluid conduit) via different or distinct conduits; wherein such different or distinct conduits may facilitate decompression of the clean fluid flowing out of the FE cylinder 210, for example during the filling configuration. For example, stream 155 could be connected to the FE cylinder 210 via the first fluid outlet, and stream 165 could be connected to the FE cylinder 210 via the first fluid inlet 216.

The pressurized filling unclean stream 261h is configured to enter the FE cylinder 210 on a downstream side (for example during the filling configuration), for example via the second fluid inlet 235; thereby providing for the FE cylinder being filled with the second fluid (e.g. unclean fluid) in a downstream side.

The FE cylinder 210 comprises one or more position sensors S1, S2, 200 configured to monitor the position of the FIS 220 within the FE cylinder 210. In an embodiment, the one or more position sensors S1, S2, 200 can be selected from the group consisting of a differential pressure transducer, a magnetic sensor, a Hall effect sensor, and combinations thereof.

The FE system 1000 can also further employ a hydraulic four-way valve 175, which is represented in FIG. 1 by a "block" valve hydraulic symbol, portraying a four-way valve. Symbolically, and as will be appreciated by one of skill in the art of hydraulics, such valve 175 can have a port connected to a hydraulic pressure source "P" and another port connected to the drain, or "TANK." The hydraulic four-way valve 175 can also have two physical connections to the left side and right side of the directional valve 150, for example as indicated by the arrows connecting the hydraulic four-way valve 175 to the valve 150. The two boxes shown in the hydraulic four-way valve 175 are just symbolic (according to the International Organization for Standardization (ISO)), representing an actual spool in a hydraulic valve: box 170a contains a crossed connectivity represented by lines 172a and 172b in FIG. 1; while box 170b contains straight connections 173a, 173b. When FIS 220 is pushed upstream to hit S2, S2 may create a "power" signal (e.g., electric signal, hydraulic signal, pneumatic signal) to 170, and thus "pushes" the box up, getting it to the configurational position as shown in FIG. 1. Connections 173a and 173b are now connected. The right side of 150 will be connected to pressure source P, while the left side is connected to tank (TANK); causing the valve 150 to slide to the left, and connecting pressurized line 165 to connect to fluid port 216, thus pushing the FIS 220 up and injecting the content of downstream FE inner chamber 211 into flow line 110 (e.g., main flow manifold 110). As soon as the FIS 220 hits the sensor S1, it generates a power signal to 171, which pushes the box 170a down to the bottom position (bottom based on the configuration shown in FIG. 1), meaning that the connection is now "crossed" like 172a and 172b; thus P is now connected to the left side of 150, and TANK is connected to the right side; hence moving valve 150 to the right; thus dumping the content of upstream FE inner chamber 211 via fluid port 216 and stream 155 into 121l. This would suck the FIS 220 upstream which is now pushed quickly by filling pump 260 and accumulator 250 and fill the downstream portion of the FE inner chamber 211 with the heavy slurry.

In an embodiment, the FE cylinder 210 can comprise a linear position sensor 200 configured to monitor the position of the FIS 220. In such embodiment, the position of the FIS 220 can be reported to a controller or processor with any suitable frequency (for example every fraction of a second, alternatively about every second, alternatively about every few seconds, etc.), and thus its velocity (for example from upstream to downstream; alternatively from downstream to upstream) can be determined. The VFR in stream 245 can therefore be checked as compared to the total VFR of stream 103 plus the VFR of stream 166S (which defines the VFR of the clean fluid); which in turn advantageously insures that the ratio between the two flows (stream 245 on one side, and combined streams 203 and 166S on the other side) may result in a fluid in stream 275 having the intended composition (e.g., a mixture having an accurate concentration of agent). In embodiments where the resulting concentration of agent in stream 275 differs from a target concentration of agent in stream 275, the VFR in stream 245 can be adjusted by modifying the setting of valve 180; which in turn modifies the VFR of the clean fluid (e.g., first fluid) flowing through the clean fluid conduit 190 to adjust the movement of the FIS 220.

In an embodiment, the FE cylinder 210 can comprise an upstream position sensor S2 and a downstream position sensor S1, wherein the upstream position sensor S2 can be located proximal to the first fluid port 216, and wherein the downstream position sensor S1 can be located proximal to the second fluid outlet 215 and/or the second fluid inlet 235. The upstream position sensor S2 and the downstream position sensor S1 can be configured to detect the movement of the FIS 220 approaching or being at the upstream end position and the downstream end position, respectively.

In an embodiment, the FE system 1000 can comprise the valve system 150; wherein, when the FE system is in the filling configuration, the valve system 150 is configured to allow for a first fluid to flow out of the FE inner chamber 211 via the first fluid port 216 into a return stream 155; and wherein, when the FE system is in the discharge configuration, the valve system 150 is configured to allow for the power stream 165 to flow into the FE inner chamber 211 via the first fluid port 216. The valve system 150 can comprise a 3-way valve or two 2-way valves.

The configuration of FE system 1000 illustrated in FIG. 1 displays the filling configuration, wherein the valve system 150 allows for the return stream 155 flowing into tank 130, or alternatively, into the suction of supplement pump 120. In aspects where the return stream 155 flows into the suction of supplement pump 120, trace amounts of sand flowing via conduit 190 from FE inner chamber 211 can be sucked out into the flow line 166, thus advantageously reducing the contamination of the clean tank 130. An optional filter element (or screen) can be placed on the left side of 121l (left side as drawn in the configuration of FIG. 1), thereby preventing contaminants from entering tank 130; wherein such contaminants can advantageously "self-clean" when FIS 220 reaches S2, awaiting its turn to inject slurry into the main flow manifold 110. Further, in embodiments where there are more than one FE 210 (thus allowing more fluid being pushed into the main flow manifold 110), such filter can remain substantially clean. The return stream 155 comprises the clean fluid (e.g., first fluid) flowing out of the FE inner chamber 211 via the first fluid port 216, wherein the return stream 155 is characterized by a pressure of from about ambient pressure to about 100 psig, alternatively from about boost pressure to about 100 psig, alternatively from about ambient pressure to about 75 psig, or alternatively from about ambient pressure to about 50 psig. The pressure of the return stream 155 can also be influenced by the pressure of stream 261h, wherein the pressure of stream 261h is transmitted into stream 155 as influenced by the restrictions, such as restriction 180 (going into the direction of 121l). The pressure of the return stream 155 is substantially the same as the pressure of the tank 130. In embodiments where the FE system is in the filling configuration, the return stream 155 flows into the tank 130. In such embodiments, the pressurized filling second fluid stream 261h is characterized by a pressure greater than the pressure of the tank 130, thereby causing the FIS 220 to move to the upstream end position. When the FIS 220 reaches the upstream end position, the valve system 150 is configured to switch from the filling configuration to the discharge configuration.

In embodiments where the FIS 220 is in the downstream end position or moving from the downstream end position to the upstream end position, the FE system 1000 is in the filling configuration; thereby allowing for the pressurized filling second fluid stream 261h to enter via the second fluid inlet 235 and fill the FE inner chamber 211 between the downstream end position and the FIS 220 while the FIS 220 moves from the downstream end position to the upstream end position (i.e., FIS 220 filling stroke).

In embodiments where the FIS 220 is in the upstream end position or moving from the upstream end position to the downstream end position, the FE system is in the discharge configuration; wherein the discharge configuration allows for the power stream 165 comprising a first fluid to enter via the first fluid port 216 and fill the FE inner chamber 211 between the upstream end position and the FIS 220 while the FIS 220 moves from the upstream end position to the downstream end position (i.e., FIS 220 discharge stroke), thereby providing for the second fluid stream 245 comprising the second fluid exiting the FE inner chamber 211 via the second fluid outlet 215. In such embodiments, a pressure of the second fluid stream 245 is substantially the same as the pressure of the power stream 165.

In embodiments where the FE system is in the discharge configuration, a pressure in an upstream side of the FE inner chamber 211 is substantially the same as a pressure of the power stream 165 flowing into FE inner chamber 211 via the first fluid conduit 190 and the first fluid port 216, thereby causing the FIS 220 to move to the downstream end position at a VFR that is about the same as a VFR of the power stream 165. In such embodiments, the power stream 165 is configured to engage and push the FIS 220 downstream, thereby providing for a second fluid stream 245 configured to enter the main flow manifold 110; wherein a VFR of the second fluid stream 245 is substantially the same as the VFR of the power stream 165.

The second fluid stream 245 enters the main flow manifold 110 and contacts the treatment stream 166S, thereby forming the manifold output fluid stream 275; wherein a concentration of agent in the manifold output fluid stream 275 is lower than a concentration of agent in the second fluid (i.e., wherein a concentration of agent in the manifold output fluid stream 275 is lower than a concentration of agent in the second fluid stream 245).

In some embodiments, and as will be described in more detail later herein, the manifold output fluid stream 275 can be a wellbore servicing fluid (WSF), wherein the WSF comprises a fracturing fluid, a gravel packing fluid, an acidizing fluid, a cement slurry, a fluid comprising a diverting material, a fluid comprising an abrasive material, a fluid comprising a fluid loss material, and the like, or combinations thereof.

In an embodiment, the FE system 1000 can comprise controller 175 having the valve spool actuators or controllers 170, 171; wherein the one or more position sensors S1, S2, 200 are configured to communicate to the spool actuator 170, 171 the position of the FIS 220. As previously described herein, S1 and S2 sense the presence of the FIS 220 near S1 and S2, respectively; while position sensor 200 (e.g., linear position sensor 200) tracks the movement of FIS 220. In embodiments where the FIS 220 is in the upstream end position, sensor S2 (or the processor, having received the FIS position data from sensor 200) sends a pressure or electric signal to the valve spool actuator 170, which actuates the valve spool 170b to engage, thereby causing pressure P to connect to the right side of the valve system 150 to allow for the power stream 165 to flow into the FE inner chamber 211, thereby providing for the discharge configuration, wherein a pressure in the first fluid conduit 190 is the pressure of the power stream 165. In embodiments where the FIS 220 is in the downstream end position, sensor S1 (or the processor, having received the FIS position data from sensor 200) sends a pressure or electric signal to the valve spool actuator 171, which actuates the valve spool 170a to engage, thereby causing pressure P to connect to the left side of the valve system 150 to allow for a first fluid to flow out of the FE inner chamber 211 via the first fluid port 216 into the return stream 155, thereby providing for the filling configuration, wherein a pressure in the first fluid conduit 190 is substantially the same as the pressure of the tank 130.

In an embodiment, and as illustrated in the configuration of FIG. 1, the FE system 1000 may comprise the upstream position sensor S2 and the downstream position sensor S1 configured to communicate the position of the FIS 220 to the valve controller 175. During the discharge stroke, the FIS 220 moves from the upstream end position to the downstream end position (e.g., from the upstream position sensor S2 towards the downstream position sensor S1). The valve controller 175 represented by the symbolic boxes 170a and 170b is a 4-way valve (as represented by the four pipe connections, P, TANK, and pipes (represented by arrows) to the left side and the right side of valve system 150, as shown in the configuration of FIG. 1). For example, and as displayed in FIG. 1, the FIS 220 could move during the discharge stroke at a pressure that is about the same as the first pressure (e.g., about 15,200 psig, as illustrated in FIG. 1). The pressure downstream of FIS 220 is equal to the first pressure minus the pressure needed to counteract friction. The slurry injected from tank 270 would provide the flow through the second fluid outlet 215; wherein there would be a pressure drop also at the discharge valve 240; which relates to the velocity of the fluid going through valve 240 into the stream 275. Further, and without wishing to be limited by theory, the pressure drop increases quadratically with the flow requirement; meaning that the choke 140 must be adjusted to increase the pressure output of pump 120. At the end of the discharge stroke, the downstream position sensor S1 transmits a signal (e.g., an electric signal, hydraulic signal, etc.) to the valve spool actuator 171 indicating that the discharge stroke ended and that the valve controller 175 must be switched to a crossed connection. Furthermore, the valve controller 175 is shown symbolically as a 4-way valve, which has a spool that has two distinct positions (170 and 171), which is represented by two distinct connection configurations represented by two boxes. Furthermore, the actual spool spatial configuration is not designed as boxes, as the boxes are just a symbolic representation according to ISO. The first box 170a of the valve controller 175 has "cross" or "X" connectors 172a, 172b. The second box 170b has parallel connectors 173a, 173b. Connector 173a as depicted connects to P (not shown in FIG. 1, pressure of a small hydraulic pump), and connector 173b connects to TANK (not shown in FIG. 1, usually it is a small hydraulic tank). Pressure connector 173a can connect to the valve system 150 (for ease of understanding, one may consider valve system 150 as a spool of a valve, that moves left or right when pushed by 173a or 173b, respectively); such that the power stream 165 is allowed to flow into the FE inner chamber 211 via the first fluid port 216 (e.g., the valve system 150 can be shifted to the left to allow for the flow of power stream 165, wherein the left direction is with respect to the outlined schematic in FIG. 1). The output pressure of supplement pump 120 can be the first pressure (e.g., about 15200 psig, as illustrated in FIG. 1), which is transmitted further to the first fluid port 216. The flow restrictor 140 controls the level of the first pressure; wherein the pressure of stream 166S is slightly higher than the pressure of stream in the main flow manifold 110 and/or stream 275 (or alternatively, there is no flow in the main flow manifold 110 and/or stream 275), and wherein the pressure difference across the flow restrictor or gate valve 140 defines the pressure difference between the upstream pressure of FIS 220 and the pressure in the main flow manifold 110 (which in turn defines the velocity of injection of the FE system 1000), the output of pump 120 is determined by the injection rate of the FE system 1000. In an embodiment, the flow restrictor 140 can be a choke set to give a desired friction allowance (e.g., a 200 psig friction allowance, for example as shown in the configuration of FIG. 1), or alternatively the flow restrictor 140 can be a variable choke. The friction allowance can be larger, such as from about 500 psig to about 1000 psig; wherein the friction allowance can dictate the speed at which the FIS 220 can move to inject slurry into the main flow manifold 110. When FIS 220 reaches or nears the downstream end position, the downstream position sensor S1 signals the valve spool actuator 171, wherein the cross connectors 172a, 172b become the connectivities of the valve controller 175, thereby connecting the pressure P to the left side of the valve system 150; such that the return stream 155 can flow to the tank 130 (e.g., the valve system 150 shifts to the right as illustrated in FIG. 1 to allow for the flow of return stream 155; wherein the right direction is with respect to the outlined schematic in FIG. 1), wherein the first fluid port 216 becomes fluidly connected through conduit 190 to the tank 130 (having a pressure from the slurry supply or second fluid stream 261h from pump 260 with a delivery pressure of about 500 psig), and the fluid flow via stream 165 is blocked. The pressure differential between the upstream side of the FE inner chamber 211 and the tank 130 becomes about near 0 psig. The filling pump 260 which operates at the second pressure (e.g., from about 50 psig to about 500 psig, or alternatively about 500 psig as illustrated in FIG. 1) can pump the pressurized filling second fluid stream 261h into the downstream side of the FE inner chamber 211, thereby pushing the FIS 220 towards the upstream end position (e.g., towards the upstream position sensor S2). When FIS 220 reaches or nears the upstream end position, the upstream position sensor S2 signals the valve spool actuator 170, which reverses the position of the valve system 150 to where the power stream 165 is allowed to flow into the FE inner chamber 211 via the first fluid port 216; and the discharge configuration and the filling configuration continue to alternate. In embodiments where more than one FE cylinder 210 is used, the upstream position sensor S2 can be temporarily disabled in all FE cylinders 210 that are not intended to undergo the discharge configuration. When it is determined that a particular FE cylinder 210 having needs to switch to the discharge configuration, the upstream position sensor S2 can be enabled in that particular FE cylinder 210. In an embodiment, the optional variable choke 180 can comprise a check valve facing the valve system 150 (and facing away from the first fluid port 216), such that when the downstream position sensor S1 is triggered, the filling stroke can occur at the most efficient speed of filling pump 260 (e.g., maximum speed of filling pump 260); and then the particular FE cylinder 210 can wait until it is determined that the discharge stroke needs to occur in that particular FE cylinder 210.

In an embodiment, the second fluid outlet 215 can comprise a discharge valve 240, wherein the discharge valve 240 is configured to be actuated in an open position during the discharge configuration, thereby allowing for the second fluid stream 245 comprising the unclean fluid to enter the main flow manifold 110; and wherein the discharge valve 240 is configured to be actuated by the relatively high pressure in the main flow manifold 110 in a closed position during the filling configuration, thereby preventing the unclean fluid from entering the main flow manifold 110.

In an embodiment, the second fluid inlet 235 can comprise an intake valve 230, wherein the intake valve 230 is configured to be actuated in an open position during the filling configuration, thereby allowing for the pressurized filling second fluid stream 261h to fill the downstream side of the FE inner chamber 211; and wherein the intake valve 230 is configured to be actuated in a closed position during the discharge configuration, by means of the relatively high pressure in the FE inner chamber 211; thereby preventing the pressurized filling second fluid stream 261h from entering the FE inner chamber 211.

In some embodiments, the discharge valve 240 and/or the intake valve 230 can be poppet valves, wherein the poppet valves are configured to act as check valves.

In some embodiments, the discharge valve 240 and/or the intake valve 230 can be oil field pump valves.

In an embodiment, the FE system 1000 can comprise one or more one or more additional pumps 100 (e.g., one or more treatment pumps; one or more additional first pumps; one or more additional high pressure pumps; one or more additional relatively high pressure pumps) configured to provide for a pressurized stream 103 comprising the first fluid (e.g., clean fluid); wherein the pressurized stream 103 is configured to enter the main flow manifold 110; wherein the pressurized stream 103 is characterized by a pressure that is substantially the same as the pressure of the stream 166S entering the main flow manifold 110. For purposes of the disclosure herein, the stream 166S can be referred to as a "treatment" stream in embodiments where the one or more one or more additional pumps 100 are not used. Further, for purposes of the disclosure herein, the stream 166S can be referred to as a "supplement" stream in embodiments where the one or more one or more additional pumps 100 are used. Furthermore, for purposes of the disclosure herein, the terms "treatment stream" and "supplement stream" can be used interchangeably with respect to stream 166S. The one or more additional pumps 100 are high pressure pumps or relatively high pressure pumps. The one or more additional pumps 100 can be any suitable high pressure pumps, such as centrifugal pumps. The one or more additional pumps 100 and the supplement pump 120 can be the same or different.

In an embodiment, the pressurized stream 103 can be combined with the supplement stream 166S and with the second fluid stream 245 to form the manifold output fluid stream 275. In such embodiment, the manifold output fluid stream 275 VFR is substantially the same as a sum of the pressurized supplement clean stream 121h VFR and a VFR of the pressurized stream 103.

In an embodiment, the pressurized supplement clean stream 121h VFR can be from about 5% to about 50%, alternatively from about 7.5% to about 47.5%, or alternatively from about 10% to about 45% of the pressurized stream 103 VFR.

In an embodiment, the pressure of the pressurized stream 103 can be lower than a pressure of the pressurized supplement clean stream 121h by from about 100 psig to about 500 psig, alternatively from about 125 psig to about 475 psig, or alternatively from about 150 psig to about 450 psig. As disclosed herein, the first valve 140 can be a pressure reducing gate configured to decrease the pressure of the supplement stream 166S by from about 100 psig to about 500 psig, alternatively from about 125 psig to about 475 psig, or alternatively from about 150 psig to about 450 psig prior to entering the main flow manifold 110, such that the pressure of the supplement stream 166S entering the main flow manifold 110 is substantially the same as the pressure of the pressurized stream 103 entering the main flow manifold 110.

In an embodiment, the FE system 1000 can comprise at least two FE cylinders 210 configured to operate in parallel, wherein at least one FE cylinder 210 is in the discharge configuration at any given time, thereby providing for a continuous operation of the FE system 1000. In such embodiments, employing the at least two FE cylinders 210 can advantageously extend the life of the one or more additional pumps 100.

In some embodiments where the FE system comprises at least two FE cylinders 210, at least two FE cylinders 210 can employ the same agent.

In other embodiments where the FE system comprises at least two FE cylinders 210, at least two FE cylinders 210 can employ agents different from each other. In such embodiments, employing different agents in different FE cylinders 210 can advantageously allow for tailoring the identity and concentration of the agent in the manifold output fluid stream 275.

In embodiments where the FE system comprises at least two FE cylinders 210, the FE cylinders 210 can be part of a relatively large operation employing a large number of pumps 100 (e.g., high pressure pumps) that are configured to pump the first fluid (e.g., clean fluid), wherein the FE cylinders 210 can advantageously extend the life of the pumps 100.

In aspects where the FE system comprises at least two FE cylinders 210 (e.g., multiple FE cylinders 210) and the multiple FE cylinders 210 employ the same second fluid (e.g., the same agent), filling of the FE cylinders 210 (e.g., fill period of the FE cylinders 210) could be done at a relatively faster rate (e.g., relatively increased frequency), wherein a signal from sensor S2 would be gated as such that it would not be able to send a "go" command to the 4-way valve controller 175 before it received a "your turn" command from other system components, such as pumps.

Figure 2:
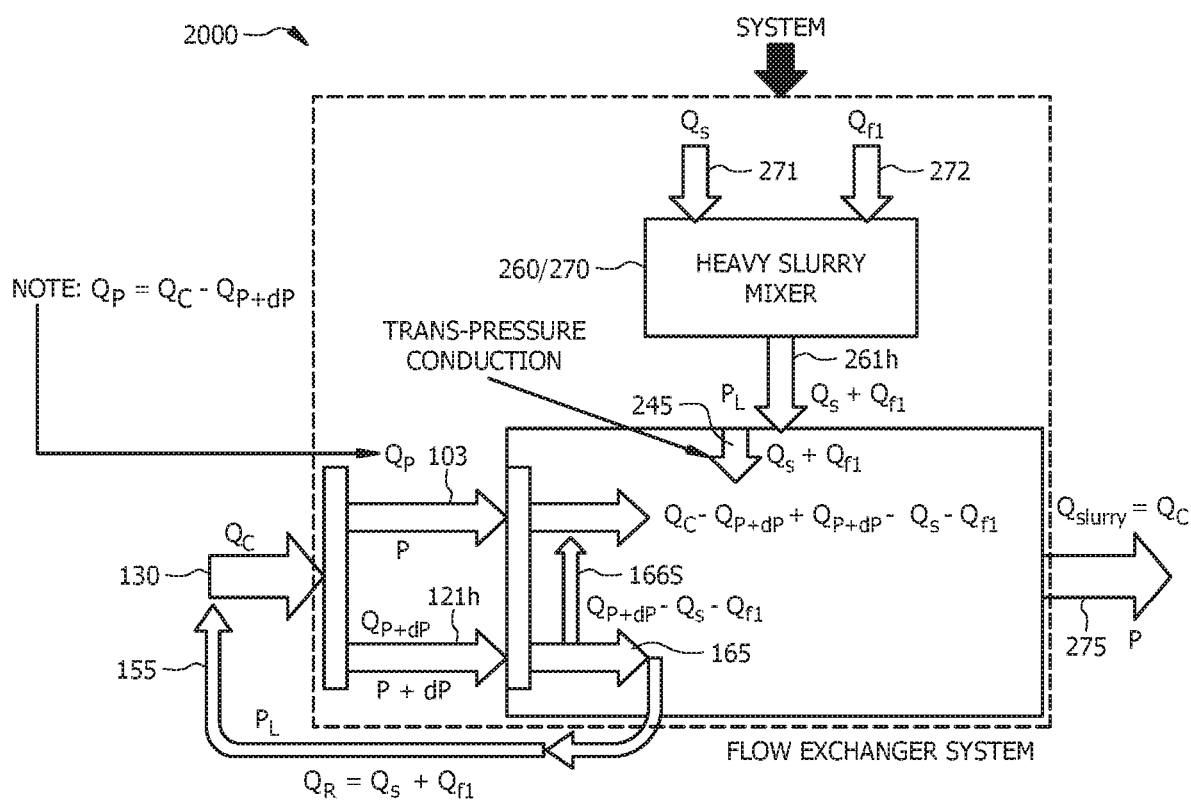
FIG. 2 displays a schematic of a high pressure stream injection system.

FIG. 2 shows a flow diagram of a novel high pressure stream injection system.

In some embodiments, for example as depicted in FIG. 2, a high pressure stream injection system 2000 as disclosed herein can comprise at least two relatively high pressure pumps configured to pump a high pressure first fluid at two different pressure levels (P (stream 103) and P+dP (stream 121h), wherein the pressure difference is dP), wherein the high pressure first fluid is substantially free of an agent (e.g., clean fluid). In FIG. 2, P denotes pressure and Q denotes VFR. The VFRs of the two high pressure first fluid streams (103, 121h) having the pressures of P and P+dP are $Q_P$ and $Q_{P+dP}$, respectively. The total VFR of the clean fluid is $Q_C$ (wherein the clean fluid can be sourced from tank 130, for example), wherein the clean fluid is split into the two high pressure first fluid streams (103, 121h) at two different pressure levels (P and P+dP), and thus $Q_C=Q_P+Q_{P+dP}$. The high pressure stream injection system 2000 comprises a relatively low pressure highly saturated unclean mixing system (e.g., heavy slurry mixer 260, 270) configured to inject a highly saturated second fluid stream (e.g., a fluid stream having the VFR=$Q_S+Q_{fl}$; and initially the relatively low pressure $P_L$ (stream 261h) that is converted to a high pressure of about P (stream 245) by trans-pressure conduction) into the high pressure first fluid of lower pressure level (e.g., fluid stream 103 having the relatively high pressure P and the VFR=$Q_P$) via a trans-pressure conduction system. The high pressure first fluid of higher pressure level (e.g., fluid stream 121h having the relatively high pressure P+dP and the VFR=$Q_{P+dP}$) diverts a fluid stream (stream 165) having a VFR=$Q_S+Q_{fl}$ and a pressure of P+dP to raise the pressure of the highly saturated second fluid stream (wherein the highly saturated second fluid stream becomes stream 245), wherein this diverted clean fluid is returned as a clean return stream of relatively low pressure (e.g., fluid stream 155 having the relatively low pressure $P_L$ and the VFR=$Q_S+Q_{fl}$) to the overall clean stream flow having the total VFR of clean fluid=$Q_C$.

The heavy slurry mixer (260, 270) mixes a solids stream (stream 271) having a VFR=$Q_s$ with a fluid stream (stream 272) having a VFR=$Q_{fl}$. The trans-pressure conduction system is powered by a volume of the high pressure first fluid of higher pressure level (e.g., a portion 165 of fluid stream 121h having the relatively high pressure P+dP and the VFR=$Q_{P+dP}$) that is substantially the same as a volume of the injected highly saturated second fluid stream (stream 245), wherein the highly saturated second fluid stream (streams 261h, 245) comprises the agent. The trans-pressure conduction system is configured to impart at least a portion of the pressure of the high pressure first fluid of higher pressure level (e.g., fluid stream 121h having the relatively high pressure P+dP and the VFR=$Q_{P+dP}$) to the highly saturated second fluid stream (stream 261h which becomes stream 245) that has substantially the same volume as the high pressure first fluid of higher pressure level (stream 165) used to pressurize the highly saturated second fluid stream.

The remaining fluid (stream 166S) after diverting fluid from the high pressure first fluid of higher pressure level (e.g., fluid stream 121h having the relatively high pressure P+dP and the VFR=$Q_{P+dP}$) undergoes a pressure reduction, thereby achieving a pressure P at a VFR=$Q_{P+dP}-Q_S-Q_{fl}$; and such remaining fluid (stream 166S) is mixed in with the high pressure first fluid of lower pressure level (e.g., fluid stream 103 having the relatively high pressure P and the VFR=$Q_P$) and with the relatively high pressure highly saturated second fluid stream (e.g., a fluid stream 245 having the VFR=Qs+ $Q_{\mathit{fl}}$; and the pressure P) to form an injectable fluid (stream 275) that has the pressure P and the VFR of $Q_{slurry}=Q_C-Q_{P+dP}+Q_{P+dP}-Qs-Q_{fl}+Qs+Q_{fl}=Q_C$.

In an embodiment, a method of unloading an agent into a pressurized fluid can comprise (a) increasing a pressure of a supplement first fluid stream 121*l* (e.g., supplement clean fluid stream; first stream at a low pressure; first stream at a relatively low pressure) with a supplement pump or supplement pump system 120 to yield a pressurized supplement first fluid stream 121*h* (e.g., pressurized supplement clean fluid stream; first stream at a high pressure; first stream at a relatively high pressure); wherein the supplement first fluid stream 121*l* and the pressurized supplement first fluid stream 121*h* comprise a clean fluid; and wherein the clean fluid is substantially free of an agent; (b) splitting the pressurized supplement first fluid stream 121*h* via a flow splitter 205 into two first fluid streams (e.g., two clean streams) comprising (i) a power stream 165 and (ii) a treatment stream or a supplement stream 166S, and allowing the treatment stream or supplement stream 166S to enter a main flow manifold 110; wherein the flow splitter 205 comprises a flow restrictor 140; wherein the flow restrictor 140 increases a pressure requirement of the pump 120 to provide a relatively higher pressured power stream 165 by from about 10 psig to about 1,000 psig prior to powering an FE cylinder 210; and wherein the flow restrictor 140 decreases a pressure of the treatment stream or supplement stream 166S by from about 10 psig to about 999 psig prior to entering the main flow manifold 110; and (c) pushing an FIS 220 inside the FE cylinder 210 on an upstream side with the power stream 165; wherein the FE cylinder 210 is filled with a second fluid (e.g., an unclean fluid) in a downstream side; wherein the movement of the FIS 220 provides for a second fluid stream (e.g., unclean fluid stream) 245 entering the main flow manifold 110; wherein the treatment stream or supplement stream 166S contacts the second fluid stream 245 to provide for a manifold output fluid stream 275; and wherein a manifold output fluid stream 275 VFR is substantially the same as a VFR of the pressurized supplement first fluid stream 121*h*. In such embodiment, a volume of the second fluid stream 245 entering the main flow manifold 110 is substantially the same as a volume of the power stream 165 diverted away from the pressurized supplement first fluid stream 121*h* to power the FE cylinder 210. In such embodiment, a VFR of the power stream 165 is from about 0.5% to about 70% of a VFR of the pressurized supplement first fluid stream 121*h*. The flow restrictor 140 can be a variable flow control valve having a low pressure drop.

In an embodiment, the method of unloading an agent into a pressurized fluid as disclosed herein can further comprise injecting at an injection point the manifold output fluid stream 275 into a wellbore and/or subterranean formation; wherein a pressure of the manifold output fluid stream 275 at the injection point is lower by from about 10 psig to about 1,000 psig than a pressure of the pressurized supplement first fluid stream 121*h*. The manifold output fluid stream 275 can be a WSF; wherein the WSF comprises a fracturing fluid, a gravel packing fluid, or an acidizing fluid. In an embodiment, the fracturing fluid can be characterized by a concentration of proppant effective to consolidate and/or enhance conductivity of at least a portion of the wellbore and/or subterranean formation. For example, the second fluid stream 245 can comprise a sand slurry having from about 20 lbs to about 27 lbs of sand per gallon of aqueous fluid, wherein the second fluid stream 245 can impart to the fracturing fluid (e.g., the manifold output fluid stream 275) a concentration of sand effective to consolidate and/or enhance conductivity of at least a portion of the wellbore and/or subterranean formation.

In an embodiment, a method of unloading an agent into a pressurized fluid can comprise (a) providing a high pressure first fluid 121*h* characterized by a first pressure and by a first VFR, wherein the high pressure first fluid 121*h* is substantially free of an agent; (b) transferring pressure energy from a first portion (e.g., stream 165) of the high pressure first fluid to a second fluid characterized by a second pressure (e.g., 261*h*) to form a high pressure second fluid (e.g., high pressure unclean fluid) 245; wherein the second pressure is lower than the first pressure; wherein the first portion (e.g., stream 165) of the high pressure first fluid is not contacted (e.g., it is not combined or mixed) with the second fluid for forming the high pressure second fluid 245; wherein the high pressure second fluid 245 is characterized by about the first pressure; and wherein the second fluid comprises the agent; and (c) contacting a second portion (e.g., stream 166S) of the high pressure first fluid with the high pressure second fluid 245 to yield a pressurized loaded fluid 275 comprising the agent; wherein the pressurized loaded fluid 275 is characterized by a pressure lower than the first pressure by from about 10 psig to about 500 psig; and wherein a VFR of the pressurized loaded fluid 275 is about the same as the first VFR. In such embodiment, a VFR of the first portion (e.g., stream 165) of the high pressure clean fluid is about the same as a VFR of the high pressure second fluid 245. In such embodiment, the agent can be a proppant; wherein the first fluid (e.g., clean fluid) is an aqueous fluid substantially free of the proppant; and wherein the second fluid (e.g., unclean fluid) comprises the aqueous fluid and the proppant.

In an embodiment, the method of unloading an agent into a pressurized fluid as disclosed herein can further comprise placing the pressurized loaded fluid 275 in a wellbore and/or subterranean formation to consolidate and/or enhance conductivity of at least a portion of the wellbore and/or subterranean formation.

In an embodiment, a method of unloading an agent into a pressurized fluid can comprise servicing a wellbore in a subterranean formation. As disclosed herein, the manifold output fluid stream (e.g., pressurized loaded fluid) 275 can be any suitable wellbore servicing fluid (WSF). As used herein, a "servicing fluid" or "treatment fluid" refers generally to any fluid that may be used in a subterranean application in conjunction with a desired function and/or for a desired purpose, including but not limited to fluids used to drill, complete, work over, fracture, repair, or in any way prepare a wellbore for the recovery of materials residing in a subterranean formation penetrated by the wellbore. Examples of wellbore servicing fluids include, but are not limited to fracturing fluids, gravel packing fluids, diverting fluids, completion fluids, washing fluids, sweeping fluids, acidizing fluids, cement slurries, drilling fluids or muds, spacer fluids, lost circulation fluids, and the like. The servicing fluid is for use in a wellbore that penetrates a subterranean formation. It is to be understood that "subterranean formation" encompasses both areas below exposed earth and areas below earth covered by water such as ocean or fresh water.

In an embodiment, the WSF includes the agent and a wellbore servicing (WS) base fluid. In some embodiments, the WS base fluid is an aqueous fluid. In other embodiments, the WS base fluid is an oil-based fluid. In yet other embodiments, the WS base fluid includes an emulsion or an invert emulsion. The WS base fluid has been described in detail previously herein as clean fluid (e.g., first fluid).

The pressurized supplement first fluid stream (e.g., high pressure first fluid) 121*h* and the second fluid stream (e.g., high pressure second fluid) 245 can be combined at the well site above the ground to form the manifold output fluid stream (e.g., pressurized loaded fluid) 275; alternatively, the pressurized supplement first fluid stream 121*h* and the second fluid stream 245 can be combined in situ inside the wellbore and/or subterranean formation (up to an including depths near wellbore perforations). In some embodiments, the manifold output fluid stream (e.g., pressurized loaded fluid) 275 can be prepared off-site, followed by transporting to (and, if necessary, stored at) the on-site location. In an embodiment, additional surfactants (e.g., conventional surfactants, conventional emulsifiers, etc.) may be added to the WSF on-the-fly (e.g., in real-time or on-location) along with the other components/additives. The resulting WSF may be pumped downhole where the agent of the WSF may function as intended (e.g., consolidate and/or enhance the conductivity of at least a portion of the wellbore and/or subterranean formation; decrease the pH; etc.).

The concentrations of the components in the WSF, e.g., the agent, can be adjusted to their desired amounts before delivering the WSF composition into the wellbore. Those concentrations thus are not limited to the original design specification of the WSF composition and can be varied to account for changes in the downhole conditions of the wellbore that may occur before the composition is actually pumped into the wellbore.

In an embodiment, the wellbore service being performed is a fracturing operation, such as for example hydraulic fracturing and/or frac-packing, wherein a WSF is placed (e.g., pumped downhole) in the formation. In such embodiment, the WSF is a fracturing fluid. As will be understood by one of ordinary skill in the art, the particular composition of a fracturing fluid will be dependent on the type of formation that is to be fractured. Fracturing fluids, in addition to an agent and a WS base fluid, typically comprise a conventional surfactant, an acid, friction reducers, gelling agents, scale inhibitors, pH-adjusting agents, oxygen scavengers, iron-control agents, corrosion inhibitors, bactericides, and the like.

In an embodiment, the fracturing fluid comprises a particulate material comprising a proppant of the type previously described herein. When deposited in a fracture, the proppant may form a proppant pack, resulting in conductive channels (e.g., flow channel spaces) through which fluids may flow to the wellbore. The proppant functions to prevent the fractures from closing due to overburden pressures.

In an embodiment, the wellbore service being performed is a gravel packing operation, wherein a WSF comprising a particulate material (e.g., gravel) is placed (e.g., pumped downhole) in the formation. In such embodiment, the WSF is a gravel packing fluid. Gravel packing operations commonly involve placing a gravel pack screen in the wellbore neighboring a desired portion of the subterranean formation, and packing the surrounding annulus between the screen and the subterranean formation with particulate materials that are sized to prevent and inhibit the passage of formation solids through the gravel pack with produced fluids. In some instances, a screenless gravel packing operation may be performed.

During well stimulation treatments, such as fracturing treatments and/or gravel packing treatments, the WSF (e.g., the fracturing fluid and/or gravel packing fluid) can suspend a particulate material (e.g., proppant, gravel, etc.) and deposit the particulate material in a desired location, such as for example a fracture, inter alia, to maintain the integrity of such fracture once the hydraulic pressure is released. After the particulate material is placed in the fracture and pumping stops, the fracture closes, wherein the particulate material prevents the fractures from closing due to overburden pressures.

In an embodiment, a method of servicing a wellbore in a subterranean formation can comprise (a) observing the depth of the formation (D) in feet; (b) observing formation data as to the pressure gradient needed to fracture the rock; (c) obtaining the average specific weight of the fluid column in the wellbore; (d) obtaining the average hydrostatic gradient of the fluid column by multiplying the value in (c) with 0.433; (e) subtracting the value obtained in (d) from the value obtained in (b); and (f) multiplying the value obtained in (e) with the formation depth in (a) plus an estimated friction loss pressure at the planned or desired fracturing rate; wherein the resulting pressure is the approximate required pressure that needs to be pumped by the one or more additional pumps 100 (while the first pump 120 pumps at a pressure that is from about 50 psig to about 1,000 psig greater than the pressure of the one or more additional pumps 100) in order to provide for the manifold output fluid stream (e.g., pressurized loaded fluid) 275 having substantially the same pressure as the output of the one or more additional pumps 100, and wherein the relatively higher output pressure of the first pump 120 is used to operate the FE system.

In an embodiment, the pressure requirements of the FE system 1000 as disclosed herein are controlled by the target well or wellbore (e.g., target pressure in the well); e.g., pressures and VFRs in the FE system 1000 as disclosed herein are controlled by the output pressure and VFR, respectively of the pressurized loaded fluid 275. The FE system as disclosed herein can be employed in order to obtain a desired or target output pressure and/or VFR (e.g., desired or target pressure and/or VFR of the pressurized loaded fluid 275), which could be defined by wellbore and/or subterranean formation characteristics, for example. Further, the pressures and/or VFRs necessary in various streams in the FE system can be assessed or calculated with having the desired or target output pressure and/or VFR as a starting point, while accounting for fluid and/or pressure losses within the FE system.

In an embodiment, an FE system and methods of using same as disclosed herein can display advantages when compared with conventional systems for providing relatively high pressure fluids comprising an agent that is undesirable in relatively high pressure pumps. When high pressure pumps are used without sand, for example, the life of pumps can be advantageously increased (e.g., at least doubled). With the FE systems disclosed herein, the high pressure pumps can deliver high pressure clean fluids, wherein the unclean fluids (e.g., proppants, sand, bauxites, etc.) are pumped at a relatively low pressure. Further, sand can be advantageously mixed at relatively high concentrations (e.g., 20 lbs/gal or higher; for example as high as 27 lbs/gal, which is known as "wet sand").

In an embodiment, the FE system as disclosed herein can advantageously employ near zero horsepower to compress a sand slurry to a high pressure slurry. For example, injection horsepower requirement for the FE system configuration in FIG. 1 (by using the numbers in FIG. 1, i.e., 15,000 psig, with a 200 psig choke), and with assuming further that the second fluid (e.g., liquid sand) is injected at a VFR of 10 barrels per minute (bpm), the "loss of horsepower" can be calculated as being equal to 200×10×0.0245 [hydraulic horse power (HHP)]=49. In embodiments where the choke would need to create a 1,000 psi pressure differential, the horsepower required for this process would be 245 HHP. As would be appreciated by one of skill in the art, and with the help of this disclosure, the additional HP number (i.e., 49 HHP) is an approximate number.

In an embodiment, the FE system as disclosed herein can advantageously employ multiple FE cylinders (e.g., cylinders 210) that may contain different materials or agents, wherein such materials or agents can be mixed and sequenced as desired in the manifold output fluid stream or pressurized loaded fluid 275.

In an embodiment, the FE system as disclosed herein can advantageously provide for accurately introducing a predetermined (e.g., desired) amount of agent in the pressurized loaded fluid 275. In an embodiment, the FE system as disclosed herein can advantageously provide for pumping abrasive materials at relatively low pressures using lower cost pumps, wherein the relatively higher pressured fluids are substantially clean liquids, non-damaging to the relatively high pressure pumps.

In an embodiment, multiple FE systems (e.g., two or more FE systems) and/or multiple FE cylinders (e.g., two or more FE cylinders) can be advantageously carried or transported on a single mobile vehicle, such as a truck or a trailer (e.g., wellbore services manifold trailer), or any other suitable transportation platform.

In an embodiment, the FE system as disclosed herein can advantageously employ a large group of relatively high pressure pumps (e.g., one or more high pressure pumps) 100 to pump clean fluids (e.g., fluids that are substantially free of proppants, abrasives, diverting materials, solid materials, and/or fluids that are damaging to the high pressure pumps) at a desired or required fracturing pressure level, wherein the desired pressure is approximately equal to a constant multiplied with the fracturing depth plus the friction loss. The constant can be any assumed value, and generally the constant is a value slightly larger than the fracturing pressure gradient minus the fluid weight gradient. Friction losses are reflected by the actual fluid friction endured in the flow lines and wellbore plus any pressure drop caused by any equipment and/or tools in the flow lines and wellbore. Desired fracturing pressures could range between from about 1,000 psig to about 15,000 psig or even much higher (such as from about 35,000 psig to about 50,000 psig). Fluid flow rates could be any suitable VFRs, such as from about 3 bpm to about 300 bpm, or even higher. In such embodiment, the FE system as disclosed herein can advantageously further employ a smaller group of relatively high pressure pumps (e.g., one or more high pressure pumps) 120 to pump substantially the same clean fluid as pumps 100, but at a slightly higher pressure than pumps 100; wherein the higher pressure fluid that is not needed to power the FIS 220 can be advantageously reduced by a pressure reducing gate (i.e., flow restrictor 140 in FIG. 1; variable flow gate), and sent back into the primary flow stream (e.g., the main flow manifold 110). VFRs of the clean fluid pumped with the pump 120 could be from about 5% to about 50% or higher of the VFRs of the clean fluid pumped with pumps 100. Pump pressures can be from about 100 psig to about 500 psig greater for the clean fluid pumped with pumps 120 when compared to the pump pressure of the clean fluid pumped with pump 100. VFRs can be advantageously accurately controlled by the variable choke 180 which can advantageously act as a "trim" for the VFR. In such embodiment, the FE system can advantageously convert the non-damaging, high flow/high pressure fluids (e.g., high pressure first fluid, high pressure clean fluid) to a new fluid mixture (e.g., manifold output fluid stream or pressurized loaded fluid 275), while preserving a substantially equal volume and/or VFR and/or pressures when converting from the high pressure clean fluid to the manifold output fluid stream or pressurized loaded fluid 275. The new fluid mixture (e.g., stream 275) could be erosive, corrosive, and/or have any other damaging qualities (e.g., any fluid mixture "unwanted" in the high cost, high pressure pumps). Such fluids unwanted in the high cost, high pressure pumps may also contain materials that are otherwise "unpumpable", such as rocks, sticks, fibers, and the like. In some embodiments, injection and/or suction valves (e.g., valves 230, 240) of the FE system may have to be modified for certain applications/fluid slurry systems, in order to allow for the unclean fluid to pass through. The concentration of the "unwanted" material must be higher in streams 261*l*, 261*h*, 245, in order to achieve the desired concentration of the "unwanted" material in the new fluid mixture (e.g., stream 275).

In an embodiment, the FE system as disclosed herein can advantageously provide for a volume of the stream 245 that is substantially the same as the volume of the stream 165 diverted away from stream 121*h*, thereby enabling the "flow exchanger" function of the disclosed system. In other words, assuming that there are N pumps pumping Q bpm clean fluid, there are Q bpm sand slurry going into the wellbore; wherein the FE system advantageously "replaces" the clean fluid with sand slurry without any substantial change to the flow rate of the overall clean fluid pumped at high pressure, which becomes the flow rate of the high pressure unclean fluid pumped in the wellbore. Additional advantages of the FE systems and methods of using same as disclosed herein may be apparent to one of skill in the art viewing this disclosure.

ADDITIONAL DISCLOSURE

Embodiment A

A flow exchanger (FE) system comprising: a supplement pump (120) configured to receive a supplement first fluid stream (121*l*) and output a pressurized supplement first fluid stream (121*h*); a flow splitter (205) comprising a flow restrictor (140), wherein the flow splitter (205) is configured to receive the pressurized supplement first fluid stream (121*h*) and output two first fluid streams comprising (i) a power stream (165) and (ii) a treatment stream (166S); a main flow manifold (110), wherein the treatment stream (166S) is configured to enter the main flow manifold (110) subsequent to passing through the flow restrictor (140); and an FE cylinder (210) having a fluid interface separator (FIS) (220), wherein the power stream (165) is configured to enter the FE cylinder (210) on an upstream side; and wherein the FE cylinder (210) is filled with a second fluid in a downstream side; wherein the power stream (165) is configured to engage and push the FIS (220) downstream, thereby providing for a second fluid stream (245) configured to enter the main flow manifold (110); wherein a volumetric flow rate (VFR) of the second fluid stream (245) is substantially the same as a VFR of the power stream (165); and wherein the main flow manifold (110) provides for a manifold output fluid stream (275) VFR that is substantially the same as a VFR of the pressurized supplement first fluid stream (121*h*).

Embodiment B

The FE system of Embodiment A, wherein the flow restrictor (140) has a variable opening or a fixed opening.

Embodiment C

The FE system of Embodiment B; wherein, when the flow restrictor (140) has a variable opening, the flow restrictor (140) is a first valve (140) configured to increase a pressure of the power stream (165) to a pressure that is from about 100 psig to about 500 psig greater than a pressure of the treatment stream (166S), prior to the power stream (165) entering the FE cylinder (210) on the upstream side; and wherein the first valve (140) is configured to decrease a pressure of the treatment stream (166S) to a pressure that is from about 100 psig to about 500 psig lower than a pressure of the power stream (165), prior to the treatment stream (166S) entering the main flow manifold (110).

Embodiment D

The FE system of Embodiment C further comprising a filling pump (260); wherein the filling pump (260) is configured to receive a filling second fluid stream (261*l*) and output a pressurized filling second fluid stream (261*h*); and wherein a pressure of the pressurized filling second fluid stream (261*h*) is lower than a pressure of the pressurized supplement first fluid stream (121*h*).

Embodiment E

The FE system of Embodiment D, wherein the FE system is transitionable between a filling configuration and a discharge configuration.

Embodiment F

The FE system of Embodiment E, wherein the FE cylinder (210) comprises an FE inner chamber (211), wherein the FIS (220) is positioned slidably inside the FE inner chamber (211), wherein the FIS (220) is movable between a downstream end position and an upstream end position within the FE inner chamber (211), wherein the downstream end position is located at a second fluid outlet (215) and/or a second fluid inlet (235), and wherein the upstream end position is located at a first fluid port (216).

Embodiment G

The FE system of Embodiment F, wherein a variable choke (180) is optionally located on a first fluid conduit (190) providing a flowpath into and/or out of the FE cylinder (210) via the first fluid port (216), and wherein the variable choke (180) is configured to control a VFR of a first fluid flowing through the first fluid conduit (190).

Embodiment H

The FE system of Embodiment G, wherein the VFR of the first fluid flowing through the first fluid conduit (190) is monitored with a flow meter (191).

Embodiment I

The FE system of Embodiment G, wherein the FE cylinder (210) further comprises a linear position sensor (200) configured to monitor the position of the FIS (220), and wherein the VFR of the first fluid flowing through the first fluid conduit (190) is determined based on the movement detected by the linear position sensor (200).

Embodiment J

The FE system of Embodiment F, wherein the FE cylinder (210) further comprises an upstream position sensor (S2) and a downstream position sensor (S1), wherein the upstream position sensor (S2) is located proximal to the first fluid port (216), wherein the downstream position sensor (S1) is located proximal to the second fluid outlet (215) and/or the second fluid inlet (235), and wherein the upstream position sensor (S2) and the downstream position sensor (S1) are configured to detect the FIS (220) approaching or being at the upstream end position and the downstream end position, respectively.

Embodiment K

The FE system of Embodiment J further comprising a valve system (150); wherein, when the FE system is in the filling configuration, the valve system (150) is configured to allow for a first fluid to flow out of the FE inner chamber (211) via the first fluid port (216) into a return stream (155), wherein the return stream (155) is characterized by a pressure of from about ambient pressure to about 100 psig; and wherein, when the FE system is in the discharge configuration, the valve system (150) is configured to allow for the power stream (165) to flow into the FE inner chamber (211) via the first fluid port (216).

Embodiment L

The FE system of Embodiment K; wherein, when the FIS (220) is in the downstream end position or moving from the downstream end position to the upstream end position, the FE system is in the filling configuration, thereby allowing for the pressurized filling second fluid stream (261*h*) to enter via the second fluid inlet (235) and fill the FE inner chamber (211) between the downstream end position and the FIS (220) while the FIS (220) moves from the downstream end position to the upstream end position; wherein the filling second fluid stream (261*l*) and the pressurized filling second fluid stream (261*h*) comprise a second fluid comprising an agent; and wherein a concentration of agent in the manifold output fluid stream (275) is lower than a concentration of agent in the second fluid.

Embodiment M

The FE system of Embodiment L; wherein, when the FE system is in the filling configuration, the return stream (155) flows into a tank (130) characterized by a pressure of from about ambient pressure to about 100 psig; wherein the pressurized filling second fluid stream (261*h*) is characterized by a pressure greater than the pressure of the tank (130), thereby causing the FIS (220) to move to the upstream end position; and wherein, when the FIS (220) reaches the upstream end position, the valve system (150) is configured to switch from the filling configuration to the discharge configuration.

Embodiment N

The FE system of Embodiment M; wherein, when the FE system is in the discharge configuration, a pressure in an upstream side of the FE inner chamber (211) is substantially the same as a pressure of the power stream (165) flowing into FE inner chamber (211) via the first fluid conduit (190) and the first fluid port (216), thereby causing the FIS (220)

to move to the downstream end position at a VFR that is about the same as a VFR of the power stream (165).

Embodiment O

The FE system of Embodiment N; wherein, when the FIS (220) is in the upstream end position or moving from the upstream end position to the downstream end position, the FE system is in the discharge configuration; wherein the discharge configuration allows for the power stream (165) comprising a first fluid to enter via the first fluid port (216) and fill the FE inner chamber (211) between the upstream end position and the FIS (220) while the FIS (220) moves from the upstream end position to the downstream end position, thereby providing for the second fluid stream (245) comprising the second fluid exiting the FE inner chamber (211) via the second fluid outlet (215); and wherein a pressure of the second fluid stream (245) is substantially the same as the pressure of the power stream (165).

Embodiment P

The FE system of Embodiment M further comprising a valve controller (175) and one or more position sensors (S1, S2, 200); wherein the one or more position sensors (S1, S2, 200) are configured to communicate to the valve controller (175) the position of the FIS (220); wherein, when the FIS (220) is in the upstream end position, the valve controller (175) actuates the valve system (150) to allow for the power stream (165) to flow into the FE inner chamber (211), thereby providing for the discharge configuration, wherein a pressure in the first fluid conduit (190) is the pressure of the power stream (165); and wherein, when the FIS (220) is in the downstream end position, the valve controller (175) actuates the valve system (150) to allow for a first fluid to flow out of the FE inner chamber (211) via the first fluid port (216) into the return stream (155), thereby providing for the filling configuration, wherein a pressure in the first fluid conduit (190) is substantially the same as the pressure of the tank (130).

Embodiment Q

The FE system of any one of Embodiments E through P further comprising one or more additional pumps (100) configured to provide for a pressurized stream (103) comprising a first fluid; wherein the pressurized stream (103) is configured to enter the main flow manifold (110); wherein the pressurized stream (103) is characterized by a pressure that is substantially the same as the pressure of the supplement stream (166S) entering the main flow manifold (110); wherein the pressurized stream (103) is combined with the supplement stream (166S) and with the second fluid stream (245) to form the manifold output fluid stream (275); and wherein the manifold output fluid stream (275) VFR is substantially the same as a sum of the pressurized supplement first fluid stream (121h) VFR and a VFR of the pressurized stream (103).

Embodiment R

A high pressure stream injection system comprising at least two relatively high pressure pumps configured to pump a high pressure first fluid at two different pressure levels, wherein the high pressure first fluid is substantially free of an agent; and a relatively low pressure highly saturated unclean mixing system configured to inject a highly saturated second fluid stream into the high pressure first fluid via a lower pressured trans-pressure conduction system powered by a volume of the high pressure first fluid of higher pressure level that is substantially the same as a volume of the injected highly saturated second fluid stream, wherein the highly saturated second fluid stream comprises the agent.

Embodiment S

The high pressure stream injection system of Embodiment R, wherein the trans-pressure conduction system is configured to impart at least a portion of the pressure of the high pressure first fluid of higher pressure level to the highly saturated second fluid stream that has substantially the same volume as the high pressure first fluid of higher pressure level.

Embodiment T

A method of unloading an agent into a pressurized fluid comprising (a) providing a high pressure first fluid (121h) characterized by a first pressure and by a first volumetric flow rate (VFR), wherein the high pressure first fluid (121*h*) is substantially free of an agent; (b) transferring pressure energy from a first portion (165) of the high pressure first fluid to a second fluid characterized by a second pressure (261*h*) to form a high pressure second fluid (245); wherein the second pressure is lower than the first pressure; wherein the first portion (165) of the high pressure first fluid is not contacted with the second fluid for forming the high pressure second fluid (245); wherein the high pressure second fluid (245) is characterized by about the first pressure; and wherein the second fluid comprises the agent; and (c) contacting a second portion (166) of the high pressure first fluid with the high pressure second fluid (245) to yield a pressurized loaded fluid (275) comprising the agent; wherein the pressurized loaded fluid (275) is characterized by a pressure lower than the first pressure by from about 10 psig to about 500 psig; and wherein a VFR of the pressurized loaded fluid (275) is about the same as the first VFR.

Embodiment U

A flow exchanger (FE) system comprising: a supplement pump (120) configured to receive a supplement clean stream (121*l*) and output a pressurized supplement clean stream (121*h*); a flow splitter (205) comprising a flow restrictor (140), wherein the flow splitter (205) is configured to receive the pressurized supplement clean stream (121*h*) and output two clean streams comprising (i) a power stream (165) and (ii) a treatment stream or a supplement stream (166/166S); a main flow manifold (110), wherein the treatment stream or the supplement stream (166/166S) is configured to enter the main flow manifold (110) subsequent to passing through the flow restrictor (140); and an FE cylinder (210) having a fluid interface separator (FIS) (220), wherein the power stream (165) is configured to enter the FE cylinder (210) on an upstream side; and wherein the FE cylinder (210) is filled with an unclean fluid in a downstream side; wherein the power stream (165) is configured to engage and push the FIS (220) downstream, thereby providing for an unclean fluid stream (245) configured to enter the main flow manifold (110); wherein a volumetric flow rate (VFR) of the unclean fluid stream (245) is substantially the same as a VFR of the power stream (165); and wherein the main flow manifold (110) provides for a manifold output fluid stream (275) VFR that is substantially the same as a VFR of the pressurized supplement clean stream (121h).

Embodiment V

The FE system of Embodiment U, wherein the flow restrictor (140) has a variable opening or a fixed opening.

Embodiment W

The FE system of Embodiment V; wherein, when the flow restrictor (140) has a variable opening, the flow restrictor (140) is a first valve (140) configured to increase a pressure of the power stream (165) to a pressure that is from about 100 psig to about 500 psig greater than a pressure of the treatment stream (166S), prior to the power stream (165) entering the FE cylinder (210) on the upstream side; and wherein the first valve (140) is configured to decrease a pressure of the treatment stream (166S) to a pressure that is from about 100 psig to about 500 psig lower than a pressure of the power stream (165), prior to the treatment stream (166S) entering the main flow manifold (110).

Embodiment X

The FE system of Embodiment W further comprising a filling pump (260); wherein the filling pump (260) is configured to receive a filling unclean stream (261l) and output a pressurized filling unclean stream (261h); and wherein a pressure of the pressurized filling unclean stream (261h) is lower than a pressure of the pressurized supplement clean stream (121h).

Embodiment Y

The FE system of Embodiment X, wherein the FE system is transitionable between a filling configuration and a discharge configuration.

Embodiment Z

The FE system of Embodiment Y, wherein the FE cylinder (210) comprises an FE inner chamber (211), wherein the FIS (220) is positioned slidably inside the FE inner chamber (211), wherein the FIS (220) is movable between a downstream end position and a upstream end position within the FE inner chamber (211), wherein the downstream end position is located at an unclean fluid outlet (215) and/or an unclean fluid inlet (235), and wherein the upstream end position is located at a clean fluid port (216).

Embodiment AA

The FE system of Embodiment Z, wherein a variable choke (180) is optionally located on a clean fluid conduit (190) providing a flowpath into and/or out of the FE cylinder (210) via the clean fluid port (216), and wherein the variable choke (180) is configured to control a VFR of a clean fluid flowing through the clean fluid conduit (190).

Embodiment BB

The FE system of Embodiment AA, wherein the VFR of the clean fluid flowing through the clean fluid conduit (190) is monitored with a flow meter (191).

Embodiment CC

The FE system of any of Embodiments AA and BB, wherein the FE cylinder (210) further comprises a linear position sensor (200) configured to monitor the position of the FIS (220), and wherein the VFR of the clean fluid flowing through the clean fluid conduit (190) is determined based on the movement detected by the linear position sensor (200).

Embodiment DD

The FE system of any of Embodiments Z through CC, wherein the FE cylinder (210) further comprises an upstream position sensor (S2) and a downstream position sensor (S1), wherein the upstream position sensor (S2) is located proximal to the clean fluid port (216), wherein the downstream position sensor (S1) is located proximal to the unclean fluid outlet (215) and/or the unclean fluid inlet (235), and wherein the upstream position sensor (S2) and the downstream position sensor (S1) are configured to detect the FIS (220) approaching or being at the upstream end position and the downstream end position, respectively.

Embodiment EE

The FE system of Embodiment DD further comprising a valve system (150); wherein, when the FE system is in the filling configuration, the valve system (150) is configured to allow for a clean fluid to flow out of the FE inner chamber (211) via the clean fluid port (216) into a return stream (155), wherein the return stream (155) is characterized by a pressure of from about ambient pressure to about 100 psig; and wherein, when the FE system is in the discharge configuration, the valve system (150) is configured to allow for the power stream (165) to flow into the FE inner chamber (211) via the clean fluid port (216).

Embodiment FF

The FE system of Embodiment EE; wherein, when the FIS (220) is in the downstream end position or moving from the downstream end position to the upstream end position, the FE system is in the filling configuration, thereby allowing for the pressurized filling unclean stream (261h) to enter via the unclean fluid inlet (235) and fill the FE inner chamber (211) between the downstream end position and the FIS (220) while the FIS (220) moves from the downstream end position to the upstream end position; wherein the filling unclean stream (261l) and the pressurized filling unclean stream (261h) comprise an unclean fluid comprising an agent; and wherein a concentration of agent in the manifold output fluid stream (275) is lower than a concentration of agent in the unclean fluid.

Embodiment GG

The FE system of Embodiment FF, wherein the supplement clean stream (121l) and the pressurized supplement clean stream (121h) comprise a clean fluid substantially free of the agent.

Embodiment HH

The FE system of Embodiment FF; wherein, when the FE system is in the filling configuration, the return stream (155) flows into a tank (130) characterized by about ambient pressure; wherein the pressurized filling unclean stream (261h) is characterized by a pressure greater than the pressure of the tank (130), thereby causing the FIS (220) to move to the upstream end position.

Embodiment II

The FE system of Embodiment HH; wherein, when the FIS (220) reaches the upstream end position, the valve system (150) is configured to switch from the filling configuration to the discharge configuration.

Embodiment JJ

The FE system of Embodiment II; wherein, when the FE system is in the discharge configuration, a pressure in an upstream side of the FE inner chamber (211) is substantially the same as a pressure of the power stream (165) flowing into FE inner chamber (211) via the clean fluid conduit (190) and the clean fluid port (216), thereby causing the FIS (220) to move to the downstream end position at a VFR that is about the same as a VFR of the power stream (165).

Embodiment KK

The FE system of Embodiment JJ; wherein, when the FIS (220) is in the upstream end position or moving from the upstream end position to the downstream end position, the FE system is in the discharge configuration; wherein the discharge configuration allows for the power stream (165) comprising a clean fluid to enter via the clean fluid port (216) and fill the FE inner chamber (211) between the upstream end position and the FIS (220) while the FIS (220) moves from the upstream end position to the downstream end position, thereby providing for the unclean fluid stream (245) comprising the unclean fluid exiting the FE inner chamber (211) via the unclean fluid outlet (215); and wherein a pressure of the unclean fluid stream (245) is substantially the same as the pressure of the power stream (165).

Embodiment LL

The FE system of any of Embodiments V through KK, wherein the first valve (140) is a variable flow control valve.

Embodiment MM

The FE system of Embodiment FF; wherein, when the flow restrictor (140) has a fixed opening, the flow restrictor (140) is a constant flow valve; wherein the variable choke (180) is positioned between the valve system (150) and the FE cylinder (210); and wherein the variable choke (180) is a variable flow control valve.

Embodiment NN

The FE system of Embodiment HH further comprising a valve controller (175) and one or more position sensors (S1, S2, 200); wherein the one or more position sensors (S1, S2, 200) are configured to communicate to the valve controller (175) the position of the FIS (220); wherein, when the FIS (220) is in the upstream end position, the valve controller (175) actuates the valve system (150) to allow for the power stream (165) to flow into the FE inner chamber (211), thereby providing for the discharge configuration, wherein a pressure in the clean fluid conduit (190) is the pressure of the power stream (165); and wherein, when the FIS (220) is in the downstream end position, the valve controller (175) actuates the valve system (150) to allow for a clean fluid to flow out of the FE inner chamber (211) via the clean fluid port (216) into the return stream (155), thereby providing for the filling configuration, wherein a pressure in the clean fluid conduit (190) is substantially the same as the pressure of the tank (130).

Embodiment OO

The FE system of Embodiment NN, wherein the one or more position sensors (S1, S2, 200) are selected from the group consisting of a differential pressure transducer, a magnetic sensor, a Hall effect sensor, and combinations thereof.

Embodiment PP

The FE system of Embodiment X, wherein the unclean fluid outlet (215) comprises a discharge valve (240), wherein the discharge valve (240) is configured to be actuated in an open position during the discharge configuration, wherein the discharge valve (240) is configured to be actuated in a closed position during the filling configuration; wherein the unclean fluid inlet (235) comprises an intake valve (230), wherein the intake valve (230) is configured to be actuated in an open position during the filling configuration, and wherein the intake valve (240) is configured to be actuated in a closed position during the discharge configuration.

Embodiment QQ

The FE system of Embodiment PP, wherein the discharge valve (240) and/or the intake valve (240) are poppet valves, and wherein the poppet valves are configured to act as check valves.

Embodiment RR

The FE system of Embodiment PP, wherein the discharge valve (240) and/or the intake valve (230) are oil field pump valves.

Embodiment SS

The FE system of any of Embodiments U through RR, wherein the FIS (220) comprises a piston, a plug, a steel plug, a cement plug, an upstream side cement plug, a downstream side cement plug, a circular plug, a wiper plug, a wiper dart, a membrane, a gel, a semisolid material, or combinations thereof.

Embodiment TT

The FE system of Embodiment Y further comprising one or more additional pumps (100) configured to provide for a pressurized stream (103) comprising a clean fluid; wherein the pressurized stream (103) is configured to enter the main flow manifold (110); wherein the pressurized stream (103) is characterized by a pressure that is substantially the same as the pressure of the supplement stream (166S) entering the main flow manifold (110); wherein the pressurized stream (103) is combined with the supplement stream (166S) and with the unclean fluid stream (245) to form the manifold output fluid stream (275); and wherein the manifold output fluid stream (275) VFR is substantially the same as a sum of the pressurized supplement clean stream (121*h*) VFR and a VFR of the pressurized stream (103).

Embodiment UU

The FE system of Embodiment TT, wherein the pressurized supplement clean stream (121h) VFR is from about 5% to about 50% of the pressurized stream (103) VFR.

Embodiment VV

The FE system of Embodiment UU, wherein the pressure of the pressurized stream (103) is lower than a pressure of the pressurized supplement clean stream (121h) by from about 100 psig to about 500 psig; wherein the first valve (140) is a pressure reducing gate configured to decrease the pressure of the supplement stream (166S) by from about 100 psig to about 500 psig prior to entering the main flow manifold (110), such that the pressure of the supplement stream (166S) entering the main flow manifold (110) is substantially the same as the pressure of the pressurized stream (103) entering the main flow manifold (110).

Embodiment WW

The FE system of Embodiment FF, wherein the agent is selected from the group consisting of a proppant, sand, rocks, sticks, fibers, gravel, sintered bauxite, a ceramic material, a diverting material, an abrasive material, a fluid loss material, an acid, HCl, HF, a scale inhibitor, a friction reducer, and combinations thereof.

Embodiment XX

The FE system of Embodiment FF, wherein the unclean fluid is a sand slurry having from about 20 lbs to about 27 lbs of sand per gallon of fluid.

Embodiment YY

The FE system of any of Embodiments U through XX, wherein the manifold output fluid stream (275) is a wellbore servicing fluid (WSF), wherein the WSF comprises a fracturing fluid, a gravel packing fluid, an acidizing fluid, a cement slurry, a fluid comprising a diverting material, a fluid comprising an abrasive material, a fluid comprising a fluid loss material, or combinations thereof.

Embodiment ZZ

The FE system of any of Embodiments U through YY, wherein a pressure of the supplement clean stream (121l) is from about ambient pressure to about 500 psig, and wherein a pressure of the pressurized supplement clean stream (121h) is from about 1,000 psig to about 50,000 psig.

Embodiment AAA

The FE system of Embodiment X, wherein a pressure of the filling unclean stream (261l) is from about ambient pressure to about 50 psig, and wherein a pressure of the pressurized filling unclean stream (261h) is from about 20 psig to about 1,000 psig.

Embodiment BBB

The FE system of any of Embodiments U through AAA, wherein the VFR of the power stream (165) is from about 1% to about 80% of a VFR of the treatment stream or supplement stream (166/166S).

Embodiment CCC

The FE system of Embodiment GG further comprising one or more flow meters (191) and/or one or more mass meters located on streams substantially free of the agent.

Embodiment DDD

The FE system of Embodiment FF comprising at least two FE cylinders (210) configured to operate in parallel, wherein at least one FE cylinder (210) is in the discharge configuration at any given time, thereby providing for a continuous operation of the FE system.

Embodiment EEE

The FE system of Embodiment DDD, wherein at least two FE cylinders (210) employ agents different from each other.

Embodiment FFF

The FE system of Embodiment DDD, wherein at least two FE cylinders (210) employ the same agent.

Embodiment GGG

The FE system of Embodiment TT comprising at least two FE cylinders (210) configured to operate in parallel; wherein at least one FE cylinder (210) is in the discharge configuration at any given time, thereby providing for a continuous operation of the FE system; and wherein employing the at least two FE cylinders (210) extends the life of the one or more additional pumps (100).

Embodiment HHH

The FE system of Embodiment X, wherein an accumulator (250) is positioned between the filling pump (260) and the FE cylinder (210), and wherein the accumulator (250) is configured to provide for a substantially uniform pressure of the pressurized filling unclean stream (261h).

Embodiment III

A method of unloading an agent into a pressurized fluid comprising (a) increasing a pressure of a supplement clean stream (121l) with a supplement pump or supplement pump system (120) to yield a pressurized supplement clean stream (121h); wherein the supplement clean stream (121l) and the pressurized supplement clean stream (121h) comprise a clean fluid; and wherein the clean fluid is substantially free of an agent; (b) splitting the pressurized supplement clean stream (121h) via a flow splitter (205) into two clean streams comprising (i) a power stream (165) and (ii) a treatment stream or a supplement stream (166/166S), and allowing the treatment stream or a supplement stream (166/166S) to enter a main flow manifold (110); wherein the flow splitter (205) comprises a flow restrictor (140); wherein the flow restrictor (140) increases a pressure of the power stream (165) by from about 10 psig to about 1,000 psig prior to powering a flow exchanger (FE) cylinder (210); and wherein the flow restrictor (140) decreases a pressure of the treatment stream or the supplement stream (166/166S) by from about 10 psig to about 1,000 psig prior to entering the main flow manifold (110); and (c) pushing a fluid interface separator (FIS) (220) inside the FE cylinder (210) on an upstream side with the power stream (165); wherein the FE cylinder (210) is filled with an unclean fluid in a downstream side; wherein the movement of the FIS (220) provides for an unclean fluid stream (245) entering the main flow manifold (110); wherein the treatment stream or a supplement stream (166/166S) contacts the unclean fluid stream (245) to provide for a manifold output fluid stream (injectable fluid, 275); and wherein a manifold output fluid stream (injectable fluid, 275) VFR is substantially the same as a VFR of the pressurized supplement clean stream (121h).

Embodiment JJJ

The method of Embodiment III, wherein a volume of the unclean fluid stream (245) entering the main flow manifold (110) is substantially the same as a volume of the power stream (165); diverted away from the pressurized supplement clean stream (121h) to power the FE cylinder (210).

Embodiment KKK

The method of any of Embodiments III and JJJ, wherein a VFR of the power stream (165) is from about 0.5% to about 70% of a VFR of the pressurized supplement clean stream (121h).

Embodiment LLL

The method of any of Embodiments III through KKK, wherein the flow restrictor (140) is a variable flow control valve having a low pressure drop.

Embodiment MMM

The method of any of Embodiments III through LLL further comprising injecting at an injection point the manifold output fluid stream (275) into a wellbore and/or subterranean formation; wherein a pressure of the manifold output fluid stream (275) at the injection point is lower by from about 10 psig to about 1,000 psig than a pressure of the pressurized supplement clean stream (121h).

Embodiment NNN

The method of Embodiment MMM, wherein the manifold output fluid stream (275) is a wellbore servicing fluid (WSF); and wherein the WSF comprises a fracturing fluid, a gravel packing fluid, or an acidizing fluid.

Embodiment OOO

The method of Embodiment NNN, wherein the fracturing fluid is characterized by a concentration of proppant effective to consolidate and/or enhance conductivity of at least a portion of the wellbore and/or subterranean formation.

Embodiment PPP

The method of any of Embodiments III through MMM, wherein the unclean fluid stream (245) comprises a sand slurry having from about 20 lbs to about 27 lbs of sand per gallon of aqueous fluid.

Embodiment QQQ

A method of unloading an agent into a pressurized fluid comprising (a) providing a high pressure clean fluid (121h) characterized by a first pressure and by a first volumetric flow rate (VFR), wherein the high pressure clean fluid (121h) is substantially free of an agent; (b) transferring pressure energy from a first portion (165) of the high pressure clean fluid to an unclean fluid characterized by a second pressure (261h) to form a high pressure unclean fluid (245); wherein the second pressure is lower than the first pressure; wherein the first portion (165) of the high pressure clean fluid is not contacted with the unclean fluid for forming the high pressure unclean fluid (245); wherein the high pressure unclean fluid (245) is characterized by about the first pressure; and wherein the unclean fluid comprises the agent; and (c) contacting a second portion (166) of the high pressure clean fluid with the high pressure unclean fluid (245) to yield a pressurized loaded fluid (275) comprising the agent; wherein the pressurized loaded fluid (275) is characterized by a pressure lower than the first pressure by from about 10 psig to about 500 psig; and wherein a VFR of the pressurized loaded fluid (275) is about the same as the first VFR.

Embodiment RRR

The method of Embodiment QQQ, wherein a VFR of the first portion (165) of the high pressure clean fluid is about the same as a VFR of the high pressure unclean fluid (245).

Embodiment SSS

The method of any of Embodiments QQQ and RRR; wherein the agent is a proppant; wherein the clean fluid is an aqueous fluid substantially free of the proppant; and wherein the unclean fluid comprises the aqueous fluid and the proppant.

Embodiment TTT

The method of Embodiment SSS further comprising placing the pressurized loaded fluid (275) in a wellbore and/or subterranean formation to consolidate and/or enhance conductivity of at least a portion of the wellbore and/or subterranean formation.

A first embodiment, which is a flow exchanger (FE) system comprising a first pump (120), a flow splitter (205), a first valve (140), an FE (210), a fluid interface separator (220), and a second pump (260); wherein the FE system is transitionable between a suction configuration and a discharge configuration; wherein the first pump (120) is configured to receive a first stream at a first low pressure (121*l*) and output the first stream at a first high pressure (121*h*), wherein the first stream (121*l*, 121*h*) comprises a first fluid, wherein the first fluid is substantially free of an agent, and wherein the high pressure first stream (121*h*) is characterized by a first volumetric flow rate (VFR); wherein the flow splitter (205) is configured to split the high pressure first stream (121*h*) into a slip stream (165) and a bulk stream (166); wherein the first valve (140) is configured to partially restrict a VFR of the bulk stream (166), thereby defining a VFR of the slip stream (165), and wherein a sum of the VFR of the bulk stream (166) and the VFR of the slip stream (165) equals about the VFR of the high pressure first stream (121*h*); wherein the FE (210) comprises an FE inner chamber (211), wherein the fluid interface separator (220) is positioned slidably inside the FE inner chamber (211), wherein the fluid interface separator (220) is movable between a first position and a second position within the FE inner chamber (211), wherein the first position is located at a second fluid outlet (215), and wherein the second position is located at a first fluid inlet (216); wherein, when the fluid interface separator (220) is in the first position or moving from the first position to the second position, the FE system is in the suction configuration, wherein the suction configuration allows for a second stream characterized by a second high pressure (261h) to enter via a second fluid inlet (235) and fill the FE inner chamber (211) between the first position and the fluid interface separator (220) while the fluid interface separator (220) moves from the first position to the second position, wherein the second stream (261l, 261h) comprises a second fluid comprising the agent; wherein the second pump (260) is configured to receive the second stream at a second low pressure (261l) and output the second stream at the second high pressure (261h), wherein the first high pressure is equal to or greater than about 500% of the second high pressure; wherein, when the fluid interface separator (220) is in the second position or moving from the second position to the first position, the FE system is in the discharge configuration, wherein the discharge configuration allows for the slip stream (165) comprising the first fluid to enter via the first fluid inlet (216) and fill the FE inner chamber (211) between the second position and the fluid interface separator (220) while the fluid interface separator (220) moves from the second position to the first position; and wherein, when the FE system is in the discharge configuration, the slip stream (165) flows via the first fluid inlet (216) into the FE inner chamber (211) at the first high pressure and moves the fluid interface separator (220) from the first position to the second position, thereby providing for a third stream (245) comprising the second fluid exiting the FE inner chamber (211) at about the first high pressure via the second fluid outlet (215); wherein the third stream (245) contacts the bulk stream (166) to form a pressurized loaded stream (275) comprising a third fluid comprising the agent, wherein a concentration of agent in the third fluid is lower than a concentration of agent in the second fluid, and wherein the pressurized loaded stream (275) is characterized by about the first high pressure and by about the first VFR.

A second embodiment, which is the FE system of the first embodiment, wherein the first valve (140) is a variable flow control valve.

A third embodiment, which is the FE system of the first embodiment further comprising a valve system (150); wherein, when the FE system is in the discharge configuration, the valve system (150) is configured to allow for the slip stream (165) characterized by the first high pressure to flow via the first fluid inlet (216) into the FE inner chamber (211); and wherein, when the FE system is in the suction configuration, the valve system (150) is configured to allow for the first fluid to flow out of the FE inner chamber (211) via a first fluid outlet into a fourth stream (155), wherein the fourth stream (155) is characterized by a pressure of equal to or lower than about the second high pressure, and wherein the first fluid inlet (216) and the first fluid outlet are the same or different.

A fourth embodiment, which is the FE system of the third embodiment, wherein the first valve (140) is a constant flow valve, wherein the FE system further comprises a second valve (180) positioned between the valve system (150) and the FE (210), and wherein the second valve (180) is a variable flow control valve.

A fifth embodiment, which is the FE system of the third embodiment further comprising one or more position sensors (S1, S2, 200) and a valve controller (175); wherein the FE (210) comprises the one or more position sensors (S1, S2, 200); wherein the one or more position sensors (S1, S2, 200) are configured to communicate to the valve controller (175) the position of the fluid interface separator (220); wherein, when the fluid interface separator (220) is in the second position, the valve controller (175) actuates the valve system (150) to allow for the slip stream (165) characterized by the first high pressure to flow into the FE inner chamber (211), thereby providing for the discharge configuration; and wherein, when the fluid interface separator (220) is in the first position, the valve controller (175) actuates the valve system (150) to allow for the first fluid to flow out of the FE inner chamber (211) via the first fluid outlet into the fourth stream (155), thereby providing for the suction configuration.

A sixth embodiment, which is the FE system of the fifth embodiment, wherein the second fluid outlet (215) comprises a discharge valve (240), wherein the discharge valve (240) is configured to be actuated in an open position during the discharge configuration, wherein the discharge valve (240) is configured to be actuated in a closed position during the suction configuration; wherein the second fluid inlet (235) comprises an intake valve (230), wherein the intake valve (230) is configured to be actuated in an open position during the suction configuration, and wherein the intake valve (230) is configured to be actuated in a closed position during the discharge configuration.

A seventh embodiment, which is the FE system of the sixth embodiment, wherein the valve controller (175) further controls the discharge valve (240) and the intake valve (230); wherein, when the fluid interface separator (220) is in the second position, the valve controller (175) actuates the discharge valve (240) in the open position and the intake valve (230) in the closed position; and wherein, when the fluid interface separator (220) is in the first position, the valve controller (175) actuates the discharge valve (240) in the closed position and the intake valve (230) in the open position.

An eighth embodiment, which is the FE system of any of the first through the seventh embodiments, wherein the fluid interface separator (220) comprises a piston, a plug, a steel plug, a cement plug, an upstream side cement plug, a downstream side cement plug, a circular plug, a wiper plug, a wiper dart, a membrane, a gel, a semisolid material, or combinations thereof.

A ninth embodiment, which is the FE system of any of the first through the eighth embodiments further comprising one or more additional pumps (100) configured to provide for a pressurized stream (103) comprising the first fluid; wherein the pressurized stream (103) is characterized by about the first high pressure and by a second VFR; wherein the pressurized stream (103) is combined with the bulk stream (166) and with the third stream (245) to form the pressurized loaded stream (275); and wherein the pressurized loaded stream (275) is characterized by a VFR that equals about the sum of the first VFR and the second VFR.

A tenth embodiment, which is the FE system of the ninth embodiment, wherein the first VFR is from about 5% to about 50% of the second VFR.

An eleventh embodiment, which is the FE system of the ninth embodiment, wherein the pressure of the pressurized stream (103) is lower than the first high pressure by from about 10 psig to about 1,000 psig; wherein the first valve (140) is a pressure reducing gate configured to reduce the pressure of the bulk stream (166) by from about 10 psig to about 1,000 psig prior to combining the bulk stream (166) with the pressurized stream (103) such that the pressure of the bulk stream (166) is about the same as the pressure of the pressurized stream (103).

A twelfth embodiment, which is the FE system of the eleventh embodiment, wherein the first valve (140) is a choke gate with a low pressure drop, and wherein the first valve (140) is configured to reduce the pressure of the bulk stream (166) by from about 100 psig to about 500 psig prior to combining the bulk stream (166) with the pressurized stream (103).

A thirteenth embodiment, which is the FE system of any of the first through the twelfth embodiments, wherein the agent is selected from the group consisting of a proppant, sand, rocks, sticks, fibers, gravel, sintered bauxite, a ceramic material, a diverting material, an abrasive material, a fluid loss material, an acid, HCl, HF, a scale inhibitor, a friction reducer, and combinations thereof.

A fourteenth embodiment, which is the FE system of any of the first through the thirteenth embodiments, wherein the second fluid is a sand slurry having from about 20 lbs to about 27 lbs of sand per gallon of fluid.

A fifteenth embodiment, which is the FE system of any of the first through the fourteenth embodiments, wherein the pressurized loaded stream (275) is a wellbore servicing fluid (WSF), wherein the WSF comprises a fracturing fluid, a gravel packing fluid, an acidizing fluid, a cement slurry, a fluid comprising a diverting material, a fluid comprising an abrasive material, a fluid comprising a fluid loss material, or combinations thereof.

A sixteenth embodiment, which is the FE system of any of the first through the fifteenth embodiments, wherein the first low pressure is from about ambient pressure to about 500 psig, and wherein the first high pressure is from about 1,000 psig to about 50,000 psig.

A seventeenth embodiment, which is the FE system of any of the first through the sixteenth embodiments, wherein the second low pressure is from about ambient pressure to about 50 psig, and wherein the second high pressure is from about 100 psig to about 1,000 psig.

An eighteenth embodiment, which is the FE system of any of the first through the seventeenth embodiments, wherein the VFR of the slip stream (165) is from about 1% to about 40% of the VFR of the bulk stream (166).

A nineteenth embodiment, which is the FE system of any of the first through the eighteenth embodiments further comprising one or more flow meters (191) and/or one or more mass meters located on streams substantially free of the agent.

A twentieth embodiment, which is the FE system of any of the first through the nineteenth embodiments comprising at least two FEs (210) configured to operate in parallel, wherein at least one FE (210) is in the discharge configuration at any given time, thereby providing for a continuous operation of the FE system.

A twenty-first embodiment, which is the FE system of the twentieth embodiment, wherein at least two FEs (210) employ agents different from each other.

A twenty-second embodiment, which is the FE system of the twentieth embodiment, wherein at least two FEs (210) employ the same agent.

A twenty-third embodiment, which is the FE system of any of the first through the twenty-second embodiments, wherein an accumulator (250) is positioned between the second pump (260) and the FE (210), and wherein the accumulator (250) is configured to provide for a substantially uniform second high pressure of the second stream (261h).

A twenty-fourth embodiment, which is a method of unloading an agent into a pressurized fluid comprising (a) increasing a pressure of a first stream (121) from a first low pressure to a first high pressure with a first pump (120), wherein the first stream (121l, 121h) comprises a first fluid, wherein the first fluid is substantially free of an agent, and wherein the high pressure first stream (121h) is characterized by a first volumetric flow rate (VFR); (b) splitting the high pressure first stream (121h) into a slip stream (165) and a bulk stream (166), wherein each of the slip stream (165) and the bulk stream (166) is characterized by the first high pressure, wherein a sum of a VFR of the slip stream (165) and a VFR of the bulk stream (166) equals about the first VFR, and wherein the VFR of the bulk stream (166) is controlled with a first valve (140), thereby defining the VFR of the slip stream (165); (c) configuring a flow exchanger (FE) (210) in a discharge configuration; wherein the FE (210) comprises an inner chamber (211); wherein the FE inner chamber (211) comprises a fluid interface separator (220) positioned slidably therein, wherein the fluid interface separator (220) is movable between a first position and a second position within the FE inner chamber (211), wherein the first position is located at a second fluid outlet (215), and wherein the second position is located at a first fluid inlet (216); wherein the discharge configuration is characterized by the fluid interface separator (220) being in the second position or moving from the second position to the first position; wherein the FE inner chamber (211) comprises a second fluid between the fluid interface separator (220) and the second fluid outlet (215); and wherein the second fluid comprises the agent; (d) introducing the slip stream (165) at the first high pressure into the FE inner chamber (211) via the first fluid inlet (216), thereby moving the fluid interface separator (220) from the second position to the first position; wherein the first fluid fills the FE inner chamber (211) between the fluid interface separator (220) and the first fluid inlet (216); wherein the second fluid exits the FE inner chamber (211) via the second fluid outlet (215) into a third stream (245), and wherein the third stream (245) comprises the second fluid at about the first high pressure; and (e) contacting the third stream (245) with the bulk stream (166) to form a pressurized loaded stream (275) comprising a third fluid comprising the agent, wherein a concentration of agent in the third fluid is lower than a concentration of agent in the second fluid, and wherein the pressurized loaded stream (275) is characterized by about the first high pressure and by about the first VFR.

A twenty-fifth embodiment, which is the method of the twenty-fourth embodiment further comprising configuring the FE (210) in a suction configuration; wherein the suction configuration is characterized by the fluid interface separator (220) being in the first position or moving from the first position to the second position; wherein a second pump (260) increases a pressure of a second stream (261) from a second low pressure to a second high pressure; wherein the first high pressure is equal to or greater than about 500% of the second high pressure; wherein the second stream (261l, 261h) comprises the second fluid; and wherein configuring the FE (210) in the suction configuration comprises decompressing the first fluid in the FE inner chamber (211) to a pressure equal to or lower than about the second high pressure.

A twenty-sixth embodiment, which is the method of the twenty-fifth embodiment, wherein configuring the FE (210) in the discharge configuration comprises a valve system (150) allowing for the slip stream (165) characterized by the first high pressure to flow into the FE inner chamber (211) via the first fluid inlet (216); and wherein configuring the FE (210) in the suction configuration comprises the valve system (150) allowing for the first fluid to flow out of the FE inner chamber (211) via a first fluid outlet into a fourth stream (155), wherein the fourth stream (155) is characterized by a pressure of equal to or lower than about the second high pressure, and wherein the first fluid inlet (216) and the first fluid outlet are the same or different.

A twenty-seventh embodiment, which is the method of any one of the twenty-fourth through the twenty-sixth embodiments, wherein the first valve (140) is a variable flow control valve having a low pressure drop.

A twenty-eighth embodiment, which is the method of any one of the twenty-fourth through the twenty-seventh embodiments further comprising introducing the pressurized loaded stream (175) in a wellbore and/or subterranean formation, wherein the pressurized loaded stream is a wellbore servicing fluid (WSF), and wherein the WSF comprises a wellbore servicing fluid (WSF), wherein the WSF comprises a fracturing fluid, a gravel packing fluid, an acidizing fluid, a cement slurry, a fluid comprising a diverting material, a fluid comprising an abrasive material, a fluid comprising a fluid loss material, or combinations thereof.

A twenty-ninth embodiment, which is a method of servicing a wellbore in a subterranean formation comprising (a) increasing a pressure of a first stream (121) from a first low pressure to a first high pressure with a first pump (120), wherein the first stream (121*l*, 121*h*) comprises a first fluid, wherein the first fluid is an aqueous fluid, wherein the first fluid is substantially free of a proppant, wherein the high pressure first stream (121*h*) is characterized by a first volumetric flow rate (VFR), and wherein the first high pressure is from about 5,000 psig to about 50,000 psig; (b) splitting the high pressure first stream (121*h*) into a slip stream (165) and a bulk stream (166); wherein each of the slip stream (165) and the bulk stream (166) is characterized by the first high pressure; wherein a sum of a VFR of the slip stream (165) and a VFR of the bulk stream (166) equals about the first VFR; wherein the VFR of the bulk stream (166) is controlled with a first valve (140), thereby defining the VFR of the slip stream (165); and wherein the VFR of the slip stream (165) is from about 5% to about 25% of the VFR of the bulk stream (166); (c) configuring a flow exchanger (FE) (210) in a discharge configuration; wherein the FE (210) comprises an inner chamber (211); wherein the FE inner chamber (211) comprises a fluid interface separator (220) positioned slidably therein, wherein the fluid interface separator (220) is movable between a first position and a second position within the FE inner chamber (211), wherein the first position is located at a second fluid outlet (215), and wherein the second position is located at a first fluid inlet (216); wherein the discharge configuration is characterized by the fluid interface separator (220) being in the second position or moving from the second position to the first position; wherein the FE inner chamber (211) comprises a second fluid between the fluid interface separator (220) and the second fluid outlet (215); and wherein the second fluid comprises the aqueous fluid and the proppant; (d) introducing the slip stream (165) at the first high pressure into the FE inner chamber (211) via the first fluid inlet (216), thereby moving the fluid interface separator (220) from the second position to the first position; wherein the first fluid fills the FE inner chamber (211) between the fluid interface separator (220) and the first fluid inlet (216); wherein the second fluid exits the FE inner chamber (211) via the second fluid outlet (215) into a third stream (245), and wherein the third stream (245) comprises the second fluid at about the first high pressure; (e) contacting the third stream (245) with the bulk stream (166) to form a wellbore servicing fluid (WSF) (275) comprising a fracturing fluid, wherein the fracturing fluid comprises the aqueous fluid and the proppant, wherein a concentration of the proppant in the fracturing fluid is lower than a concentration of the proppant in the second fluid, and wherein the WSF (275) is characterized by about the first high pressure and by about the first VFR; and (f) placing the WSF (275) in the wellbore and/or subterranean formation to consolidate and/or enhance conductivity of at least a portion of the wellbore and/or subterranean formation.

A thirtieth embodiment, which is the method of the twenty-ninth embodiment further comprising configuring the FE (210) in a suction configuration; wherein the suction configuration is characterized by the fluid interface separator (220) being in the first position or moving from the first position to the second position; wherein a second pump (260) increases a pressure of a second stream (261) from a second low pressure to a second high pressure; wherein the second high pressure is from about 50 psig to about 500 psig; wherein the second stream (261*l*, 261*h*) comprises the second fluid; and wherein configuring the FE (210) in the suction configuration comprises decompressing the first fluid in the FE inner chamber (211) to a pressure equal to or lower than about the second high pressure.

A thirty-first embodiment, which is the method of the thirtieth embodiment, wherein configuring the FE (210) in the discharge configuration comprises a valve system (150) allowing for the slip stream (165) characterized by the first high pressure to flow into the FE inner chamber (211) via the first fluid inlet (216); and wherein configuring the FE (210) in the suction configuration comprises the valve system (150) allowing for the first fluid to flow out of the FE inner chamber (211) via a first fluid outlet into a fourth stream (155), wherein the fourth stream (155) is characterized by a pressure of equal to or lower than about the second high pressure, and wherein the first fluid inlet (216) and the first fluid outlet are the same or different.

A thirty-second embodiment, which is the method of the thirty-first embodiment, wherein the fourth stream (155) is characterized by ambient pressure, wherein the fourth stream (155) is introduced to a reservoir (130) comprising the first fluid at ambient pressure, and wherein the reservoir (130) provides the first fluid for the first stream (121*l*, 121*h*).

A thirty-third embodiment, which is the method of the thirty-first embodiment, wherein the first fluid inlet (216) and the first fluid outlet are the same, and wherein the slip stream (165) flows between the valve system (150) and the FE (210) during the discharge configuration through at least a portion of the same conduit (190) as the fourth stream (155) flowing between the valve system (150) and the FE (210) during the suction configuration.

A thirty-fourth embodiment, which is the method of any one of the twenty-ninth through the thirty-third embodiments, wherein the second fluid is a sand slurry having from about 20 lbs to about 27 lbs of sand per gallon of aqueous fluid.

A thirty-fifth embodiment, which is the method of any one of the twenty-ninth through the thirty-fourth embodiments, wherein the fracturing fluid is characterized by a concentration of proppant effective to consolidate and/or enhance conductivity of at least a portion of the wellbore and/or subterranean formation.

A thirty-sixth embodiment, which is a method of unloading an agent into a pressurized fluid comprising (a) providing a high pressure first fluid (121*h*) characterized by a first high pressure and by a first volumetric flow rate (VFR), wherein the high pressure first fluid (121*h*) is substantially free of an agent; (b) transferring pressure from a first portion (165) of the high pressure first fluid to a second fluid characterized by a second high pressure (261h) to form a high pressure second fluid (245); wherein the second high pressure is lower than the first high pressure; wherein the first portion (165) of the high pressure first fluid is not contacted with the second fluid for forming the high pressure second fluid (245); wherein the high pressure second fluid (245) is characterized by about the first high pressure; and wherein the second fluid comprises the agent; and (c) contacting a second portion (166) of the high pressure first fluid with the high pressure second fluid (245) to yield a pressurized loaded fluid (275) comprising the agent; wherein the pressurized loaded fluid (275) is characterized by about the first high pressure; and wherein a VFR of the pressurized loaded fluid (275) is about the same as the first VFR.

A thirty-seventh embodiment, which is the method of the thirty-sixth embodiment, wherein a VFR of the first portion (165) of the high pressure first fluid is about the same as a VFR of the high pressure second fluid (245).

A thirty-eighth embodiment, which is the method of any one of the the thirty-sixth and thirty-seventh embodiments, wherein the agent is a proppant; wherein the first fluid is an aqueous fluid substantially free of the proppant; and wherein the second fluid comprises the aqueous fluid and the proppant.

A thirty-ninth embodiment, which is the method of the thirty-eighth embodiment further comprising placing the pressurized loaded fluid (275) in a wellbore and/or subterranean formation to consolidate and/or enhance conductivity of at least a portion of the wellbore and/or subterranean formation.

While embodiments of the disclosure have been shown and described, modifications thereof can be made by one skilled in the art without departing from the spirit and teachings of the disclosure. The embodiments described herein are exemplary only, and are not intended to be limiting. Many variations and modifications of the disclosure disclosed herein are possible and are within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_L$, and an upper limit, $R_U$, is disclosed, any number falling within the range is specifically disclosed. In particular, the following numbers within the range are specifically disclosed: $R=R_L+k*(R_U-R_L)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. When a feature is described as "optional," both embodiments with this feature and embodiments without this feature are disclosed. Similarly, the present disclosure contemplates embodiments where this feature is required and embodiments where this feature is specifically excluded. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present disclosure. Thus, the claims are a further description and are an addition to the embodiments of the present disclosure. The discussion of a reference in the Description of Related Art is not an admission that it is prior art to the present disclosure, especially any reference that may have a publication date after the priority date of this application. The disclosures of all patents, patent applications, and publications cited herein are hereby incorporated by reference, to the extent that they provide exemplary, procedural or other details supplementary to those set forth herein.

What is claimed is:

1. A flow exchanger (FE) system comprising:
a supplement pump configured to receive a supplement stream comprising a first fluid and output a pressurized supplement stream of the first fluid;
a flow splitter comprising a flow restrictor, wherein the flow splitter is configured to receive the pressurized supplement stream of the first fluid and output two streams of the first fluid comprising (i) a power stream and (ii) a treatment stream;
a main flow manifold, wherein the treatment stream is configured to enter the main flow manifold subsequent to passing through the flow restrictor; and
an FE cylinder having a fluid interface separator (FIS), wherein the power stream is configured to enter the FE cylinder on an upstream side; and wherein the FE cylinder is filled with a second fluid in a downstream side;
wherein the power stream is configured to engage and push the FIS downstream in the FE cylinder, thereby providing for a stream of the second fluid configured to enter the main flow manifold;
wherein a volumetric flow rate (VFR) of the stream of the second fluid is substantially the same as a VFR of the power stream; and
wherein the main flow manifold provides for a manifold output fluid stream VFR that is substantially the same as a VFR of the pressurized supplement stream of the first fluid.

2. The FE system of claim 1, wherein the flow restrictor has a variable opening or a fixed opening.

3. The FE system of claim 2; wherein, when the flow restrictor has a variable opening, the flow restrictor is a first valve configured to increase a pressure of the power stream to a pressure that is from about 100 psig to about 500 psig greater than a pressure of the treatment stream, prior to the power stream entering the FE cylinder on the upstream side; and wherein the first valve is configured to decrease a pressure of the treatment stream to a pressure that is from about 100 psig to about 500 psig lower than a pressure of the power stream, prior to the treatment stream entering the main flow manifold.

4. The FE system of claim 3 further comprising a filling pump; wherein the filling pump is configured to receive a filling stream of the second fluid and output a pressurized filling stream of the second fluid; and wherein a pressure of the pressurized filling stream of the second fluid is lower than a pressure of the pressurized supplement stream of the first fluid.

5. The FE system of claim 4, wherein the FE system is transitionable between a filling configuration and a discharge configuration.

6. The FE system of claim 5, wherein the FE cylinder comprises an FE inner chamber, wherein the FIS is positioned slidably inside the FE inner chamber, wherein the FIS is movable between a downstream end position and an upstream end position within the FE inner chamber, wherein the downstream end position is located at a second fluid outlet and/or a second fluid inlet, and wherein the upstream end position is located at a first fluid port.

7. The FE system of claim 6, wherein a variable choke is optionally located on a first fluid conduit providing a flowpath into and/or out of the FE cylinder via the first fluid port, and wherein the variable choke is configured to control a VFR of the first fluid flowing through the first fluid conduit.

8. The FE system of claim 7, wherein the VFR of the first fluid flowing through the first fluid conduit is monitored with a flow meter.

9. The FE system of claim 7, wherein the FE cylinder further comprises a linear position sensor configured to monitor the position of the FIS, and wherein the VFR of the first fluid flowing through the first fluid conduit is determined based on the movement of the FIS as detected by the linear position sensor.

10. The FE system of claim 6, wherein the FE cylinder further comprises an upstream position sensor and a downstream position sensor, wherein the upstream position sensor is located proximal to the first fluid port, wherein the downstream position sensor is located proximal to the second fluid outlet and/or the second fluid inlet, and wherein the upstream position sensor and the downstream position sensor are configured to detect the FIS approaching or being at the upstream end position and the downstream end position, respectively.

11. The FE system of claim 10 further comprising a valve system; wherein, when the FE system is in the filling configuration, the valve system is configured to allow for the first fluid to flow out of the FE inner chamber via the first fluid port into a return stream, wherein the return stream is characterized by a pressure of from about ambient pressure to about 100 psig; and wherein, when the FE system is in the discharge configuration, the valve system is configured to allow for the power stream to flow into the FE inner chamber via the first fluid port.

12. The FE system of claim 11; wherein, when the FIS is in the downstream end position or moving from the downstream end position to the upstream end position, the FE system is in the filling configuration, thereby allowing for the pressurized filling stream of the second fluid to enter via the second fluid inlet and fill the FE inner chamber between the downstream end position and the FIS while the FIS moves from the downstream end position to the upstream end position; wherein the filling stream of the second fluid and the pressurized filling stream of the second fluid comprise the second fluid comprising an agent; and wherein a concentration of agent in the manifold output fluid stream is lower than a concentration of agent in the second fluid.

13. The FE system of claim 12; wherein, when the FE system is in the filling configuration, the return stream flows into a tank characterized by a pressure of from about ambient pressure to about 100 psig; wherein the pressurized filling stream of the second fluid is characterized by a pressure greater than the pressure of the tank, thereby causing the FIS to move to the upstream end position; and wherein, when the FIS reaches the upstream end position, the valve system is configured to switch from the filling configuration to the discharge configuration.

14. The FE system of claim 13; wherein, when the FE system is in the discharge configuration, a pressure in an upstream side of the FE inner chamber is substantially the same as a pressure of the power stream flowing into FE inner chamber via the first fluid conduit and the first fluid port, thereby causing the FIS to move to the downstream end position at a VFR that is about the same as a VFR of the power stream.

15. The FE system of claim 14; wherein, when the FIS is in the upstream end position or moving from the upstream end position to the downstream end position, the FE system is in the discharge configuration;
wherein the discharge configuration allows for the power stream comprising the first fluid to enter via the first fluid port and fill the FE inner chamber between the upstream end position and the FIS while the FIS moves from the upstream end position to the downstream end position, thereby providing for the stream of the second fluid comprising the second fluid exiting the FE inner chamber via the second fluid outlet; and
wherein a pressure of the stream of the second fluid is substantially the same as the pressure of the power stream.

16. The FE system of claim 13 further comprising a valve controller and one or more position sensors;
wherein the one or more position sensors comprise a linear position sensor, the upstream position sensor, the downstream position sensor, or combinations thereof,
wherein the one or more position sensors are configured to communicate to the valve controller the position of the FIS;
wherein, when the FIS is in the upstream end position, the valve controller actuates the valve system to allow for the power stream to flow into the FE inner chamber, thereby providing for the discharge configuration, wherein a pressure in the first fluid conduit is the pressure of the power stream; and
wherein, when the FIS is in the downstream end position, the valve controller actuates the valve system to allow for the first fluid to flow out of the FE inner chamber via the first fluid port into the return stream, thereby providing for the filling configuration, wherein a pressure in the first fluid conduit is substantially the same as the pressure of the tank.

17. The FE system of claim 5 further comprising one or more additional pumps configured to provide for a pressurized stream comprising the first fluid; wherein the pressurized stream is configured to enter the main flow manifold; wherein the pressurized stream is characterized by a pressure that is substantially the same as the pressure of the treatment stream entering the main flow manifold; wherein the pressurized stream is combined with the treatment stream and with the stream of the second fluid to form the manifold output fluid stream; and wherein the manifold output fluid stream VFR is substantially the same as a sum of the VFR of the pressurized supplement stream of the first fluid and a VFR of the pressurized stream.

* * * * *